US012641416B2

(12) United States Patent　　　　(10) Patent No.:　US 12,641,416 B2

Hong　　　　　　　　　　　　　　　(45) Date of Patent:　May 26, 2026

(54) METHOD AND DEVICE FOR CONFIGURING SHARED CELL IN COMMUNICATION SYSTEM

(71) Applicant: SOLiD, Inc., Seongnam-si (KR)

(72) Inventor: Hoony Hong, Seoul (KR)

(73) Assignee: SOLiD LABS, INC., Seongnam-si (KR)

( * ) Notice: Subject to any disclaimer, the term of this patent is extended or adjusted under 35 U.S.C. 154(b) by 308 days.

(21) Appl. No.: 18/453,624

(22) Filed: Aug. 22, 2023

(65) Prior Publication Data

US 2024/0205666 A1　　Jun. 20, 2024

(30) Foreign Application Priority Data

Aug. 22, 2022　(KR) ......................... 10-2022-0104921
Aug. 22, 2023　(KR) ......................... 10-2023-0109709

(51) Int. Cl.
H04W 8/22　　　　(2009.01)
H04L 27/26　　　　(2006.01)
H04W 72/0446　　(2023.01)

(52) U.S. Cl.
CPC ......... H04W 8/22 (2013.01); H04L 27/26025 (2021.01); H04W 72/0446 (2013.01)

(58) Field of Classification Search
CPC ... H04W 8/22; H04W 72/0446; H04W 72/29; H04W 56/001; H04W 88/085; H04L 27/26025
See application file for complete search history.

(56) References Cited

U.S. PATENT DOCUMENTS

| | | | |
|---|---|---|---|
| 2021/0126760 A1* | 4/2021 | Lee ...................... | H04B 7/0617 |
| 2021/0385686 A1* | 12/2021 | Ahmed ................ | H04W 28/06 |
| 2023/0115400 A1* | 4/2023 | Jeon ...................... | H04W 72/29 |
| | | | 370/235 |
| 2023/0231686 A1 | 7/2023 | Jeon et al. | |
| 2023/0239824 A1* | 7/2023 | Teshima .............. | H04W 56/003 |
| | | | 370/350 |
| 2024/0063851 A1* | 2/2024 | Sachidanand Sinha ..................... | |
| | | | H04B 7/0628 |
| 2024/0063854 A1* | 2/2024 | Athley .................. | H04L 5/0023 |

FOREIGN PATENT DOCUMENTS

| | | |
|---|---|---|
| KR | 10-2022-0037306 A | 3/2022 |
| WO | 2021/075934 A1 | 4/2021 |
| WO | 2022/173506 A1 | 8/2022 |

* cited by examiner

*Primary Examiner* — Thinh D Tran
(74) *Attorney, Agent, or Firm* — Sughrue Mion, PLLC

(57) ABSTRACT

A method performed by a middle node in a communication system includes: receiving a request message for capability information from a controller, transmitting capability information of the middle node as a response to the request message; and receiving timing information corresponding to multiple subcarrier spacings (SCSs) from the controller based on the capability information of the middle node.

10 Claims, 18 Drawing Sheets

| | 0 (msb) | 1 | 2 | 3 | 4 | 5 | 6 | 7 (lsb) | # of bytes | |
|---|---|---|---|---|---|---|---|---|---|---|
| | | | | Section Type 1 : DL/UL control msgs | | | | | | |
| 502 | | | | transport header (501) | | | | Octel 1 | | |
| | dataDirection | payloadVersion | | | | filterIndex (504) | | | 8 | Octel 1 |
| | | | | frameId (506) | | | | | 1 | Octel 9 |
| | subframeId (508) | | | | | slotId (510) | | | 1 | Octel 10 |
| | slotId | | | | startSymbolId (512) | | | | 1 | Octel 11 |
| | | | numberOfsections (514) | | | | | | 1 | Octel 12 |
| | | | sectionType = 1 (516) | | | | | | 1 | Octel 13 |
| | | | udCompHdr (518) | | | | | | 1 | Octel 14 |
| | | | reserved | | | | | | 1 | Octel 15 |
| | | | sectionId | | | | | | 1 | Octel 16 |
| | sectionId | | | | rd | symInc | startPrbc | | 1 | Octel 17 |
| | | | startPrbc | | | | | | 1 | Octel 18 |
| | | | numPrbc | | | | | | 1 | Octel 19 |
| | reMask[11:4] | | | | | | | | 1 | Octel 20 |
| | reMask[3:0] | | | | | | numSymbol | | 1 | Octel 21 |
| | ef=1 (520) | | beamId[14:8] | | | | | | 1 | Octel 22 |
| | beamId[7:0] | | | | | | | | 1 | Octel 23 |
| | Section Extensions as indicated by "ef" | | | | | | | | var | Octel 24 |
| | | | | | | | | | | Octel 25 |
| | | | | ... | | | | | | |
| | | | sectionId | | | | | | 1 | Octel N |
| | sectionId (522) | | | rb (524) | symInc | startPrbc (526) | | | 1 | N+1 |
| | | | startPrbc | | | | | | 1 | N+2 |
| | | | numPrbc (528) | | | | | | 1 | N+3 |
| | reMask[11:4] (530) | | | | | | | | 1 | N+4 |
| | reMask[3:0] | | | | | | numSymbol (532) | | 1 | N+5 |
| | ef=0 (534) | | beamId[14:8] (536) | | | | | | 1 | N+6 |
| | beamId[7:0] (538) | | | | | | | | 1 | N+7 |
| | Section Extensions as indicated by "ef" | | | | | | | | var | N+8 |

NOTE: Shading: yellow is transport header. pink is radio application header, others are repeated sections Application Header (540)

Section Header (542)

| Section Type 3 :PRACH & mixed-numerology | | | | | | | | # of bytes | |
|---|---|---|---|---|---|---|---|---|---|
| 0 (msb) | 1 | 2 | 3 | 4 | 5 | 6 | 7 (lsb) | # of bytes | |
| transport header | | | | | | | | 8 | Octel 1 |
| dataDirection | payloadVersion | | | filterIndex | | | | 1 | Octel 9 |
| frameId | | | | | | | | 1 | Octel 10 |
| subframeId | | | | slotId | | | | 1 | Octel 11 |
| slotId | | | startSymbolId | | | | | 1 | Octel 12 |
| numberOfsections | | | | | | | | 1 | Octel 13 |
| sectionType = 3 | | | | | | | | 1 | Octel 14 |
| timeOffset (550) | | | | | | | | 1 | Octel 15 |
| frameStructure (552) | | | | | | | | 1 | Octel 17 |
| cpLength (554) | | | | | | | | 1 | Octel 18 |
| udCompHdr (556) | | | | | | | | 1 | Octel 20 |
| sectionId | | | | | | | | 1 | Octel 21 |
| sectionId | | | rd | symInc | | startPrbc | | 1 | Octel 22 |
| startPrbc | | | | | | | | 1 | Octel 23 |
| numPrbc | | | | | | | | 1 | Octel 24 |
| reMask[11:4] | | | | | | | | 1 | Octel 25 |
| reMask[3:0] | | | numSymbol | | | | | 1 | Octel 26 |
| ef | beamId[14:8] | | | | | | | 1 | Octel 27 |
| beamId[7:0] | | | | | | | | 1 | Octet 28 |
| freqOffset | | | | | | | | 1 | Octet 29 |
| reserved (8 bits) | | | | | | | | 1 | Octet 32 |
| Section Extensions as indicated by "ef" | | | | | | | | var | Octet 33 |
| . . . | | | | | | | | | |
| sectionId | | | | | | | | 1 | Octet N |
| sectionId | | | rb | symInc | | startPrbc | | 1 | N+1 |
| startPrbc | | | | | | | | 1 | N+2 |
| numPrbc | | | | | | | | 1 | N+3 |
| reMask[11:4] | | | | | | | | 1 | N+4 |
| reMask[3:0] | | | numSymbol | | | | | 1 | N+5 |
| ef=0 | beamId[14:8] | | | | | | | 1 | N+6 |
| beamId[7:0] | | | | | | | | 1 | N+7 |
| freqOffset | | | | | | | | 3 | N+8 |
| reserved (8 bits) | | | | | | | | 1 | N+11 |
| Section Extensions as indicated by "ef" | | | | | | | | var | N+12 |

Figure 8:
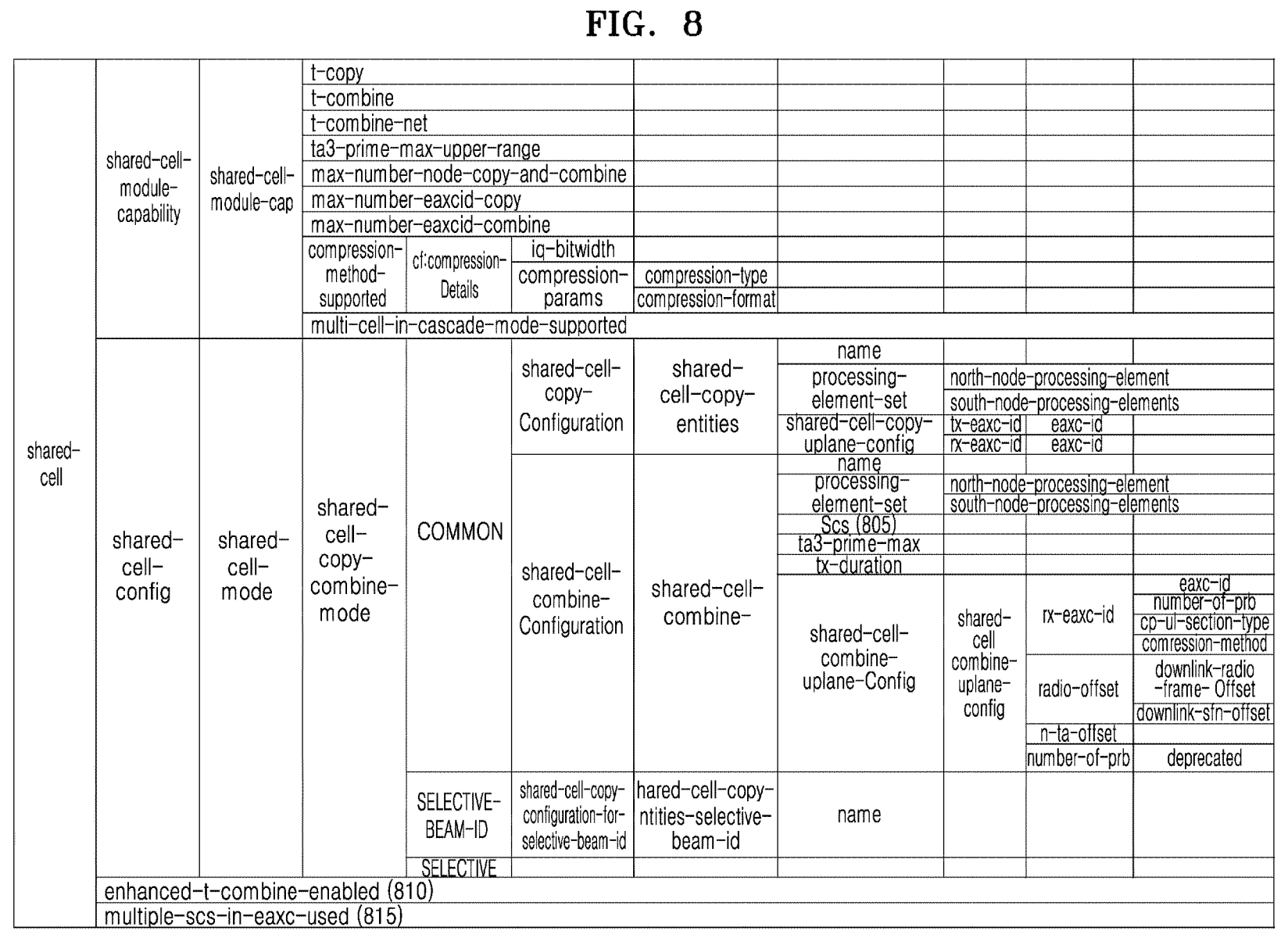

| shared-cell | | | | | | | | |
|---|---|---|---|---|---|---|---|---|
| | shared-cell-config | shared-cell-module-capability | shared-cell-module-cap | t-copy | | | | |
| | | | | t-combine | | | | |
| | | | | t-combine-net | | | | |
| | | | | ta3-prime-max-upper-range | | | | |
| | | | | max-number-node-copy-and-combine | | | | |
| | | | | max-number-eaxcid-copy | | | | |
| | | | | max-number-eaxcid-combine | | | | |
| | | | | compression-method-supported | cf:compression-Details | iq-bitwidth | | |
| | | | | | | compression-params | compression-type | |
| | | | | | | | compression-format | |
| | | | | multi-cell-in-cascade-mode-supported | | | | |
| | | shared-cell-mode | shared-cell-copy-Configuration | shared-cell-copy-entities | name | | | |
| | | | | | processing-element-set | north-node-processing-element | | |
| | | | | | | south-node-processing-elements | | |
| | | | | | shared-cell-copy-uplane-config | tx-eaxc-id | eaxc-id | |
| | | | | | | rx-eaxc-id | eaxc-id | |
| | | | shared-cell-copy-combine-mode | | | | | |
| | | | shared-cell-combine-Configuration | shared-cell-combine- | name | | | |
| | | | | | processing-element-set | north-node-processing-element | | |
| | | | | | | south-node-processing-elements | | |
| | | | | | Scs (805) | | | |
| | | | | | ta3-prime-max | | | |
| | | | | | tx-duration | | | |
| | | | | shared-cell-combine- | shared-cell-combine-uplane-Config | shared-cell-combine-uplane-config | rx-eaxc-id | |
| | | | | | | | radio-offset | downlink-radio-frame-Offset |
| | | | | | | | | downlink-sfn-offset |
| | | | | | | | n-ta-offset | |
| | | | | | | | number-of-prb | eaxc-id |
| | | | | | | | | number-of-prb |
| | | | | | | | | cp-ul-section-type |
| | | | | | | | | comression-method |
| | | | | | name | | deprecated | |
| | SELECTIVE-BEAM-ID | shared-cell-copy-configuration-for-selective-beam-id | hared-cell-copy-ntities-selective-beam-id | | | | | |
| | SELECTIVE | | | | | | | |
| enhanced-t-combine-enabled (810) | | | | | | | | |
| multiple-scs-in-eaxc-used (815) | | | | | | | | |
| COMMON | | | | | | | | |

METHOD AND DEVICE FOR CONFIGURING SHARED CELL IN COMMUNICATION SYSTEM

CROSS-REFERENCE TO RELATED APPLICATIONS

This application claims the benefits of Korean Patent Applications No. 10-2022-0104921, filed on Aug. 22, 2022 and No. 10-2023-0109709, filed on Aug. 22, 2023, in the Korean Intellectual Property Office, the disclosures of which are incorporated herein in their entireties by reference.

BACKGROUND

1. Field

The present disclosure relates to a method and a device for configuring a shared cell in a communication system, and more particularly, to a device and method for configuring a shared cell in a network infrastructure.

2. Description of the Related Art

As wireless communication systems develop and evolve into 4th generation communication systems and 5g generation communication systems, various functions and specifications are required. In order to satisfy these functions and specifications, various methods have been introduced, and one of them is a method of implementing a network infrastructure by functionally splitting it. As a representative configuration of the functional split method, a base station may be represented as a centralized unit (CU), distributed unit (DU), and radio unit (RU) depending on its function, and the interface of each unit is defined by organizations such as 3GPP and O-RAN alliance.

SUMMARY

Provided are methods of configuring a shared cell to efficiently utilize communication in a fronthaul.

Provided are methods of configuring a shared cell to reduce resource waste and increase communication quality when performing communication in O-RAN.

According to an aspect of an embodiment, a method performed by a middle node in a communication system, the method includes: receiving, from a controller, a request message for capability information; transmitting capability information of the middle node in response to the request message; and receiving, from the controller, timing information corresponding to multiple subcarrier spacings (SCSs) based on the capability information of the middle node In addition, the capability information of the middle node further comprises: information indicating a maximum time required when the middle node performs uplink data combining; and information indicating whether the middle node processes the uplink data when one eAxC ID includes multiple SCSs.

In addition, the timing information corresponding to the multiple SCSs comprises: information indicating latest timing at which the middle node transmits combined uplink data to a first communication node for each same reference timing In addition, the method further comprises receiving, from the controller, information indicating that one eAxC ID includes multiple SCS in uplink data to be received by the middle node. In addition, the middle node is a fronthaul multiplexer (FHM) or a cascade radio unit (RU), and the first communication node is a distributed unit (DU) or another middle node.

According to another aspect of an embodiment, A middle node in a communication system, the middle node includes a transceiver; a memory; and at least one processor electrically connected to the transceiver and the memory, wherein the at least one processor is configured to: receive, from a controller, a request message for capability information; transmit capability information of the middle node in response to the request message; and receive, from the controller, timing information corresponding to multiple subcarrier spacings (SCSs) based on the capability information of the middle node.

According to an embodiment, resources may be saved and communication quality may be improved by minimizing additional delay by having one middle node process messages with different SCSs in a shared cell.

In addition, according to an embodiment, a middle node may efficiently utilize resources by effectively processing messages corresponding to SCSs corresponding to one eAxC ID.

Effects according to the inventive concept are not limited to the effects described above, and other effects not described herein may be clearly understood by one of ordinary skill in the art from the following description.

BRIEF DESCRIPTION OF THE DRAWINGS

Embodiments of the disclosure will be more clearly understood from the following detailed description taken in conjunction with the accompanying drawings in which:

FIGS. 5A and 5B are views illustrating an example of a C-plane message according to an embodiment;

FIG. 6A is a view of a structure of an O-RAN base station including a middle node according to an embodiment;

FIG. 6B is a view illustrating a situation in which uplink data transmitted from multiple O-DUs included in multiple cells are combined, according to an embodiment;

FIG. 8 is a table illustrating a data structure used when performing communication according to an embodiment;

3

Figure 11:
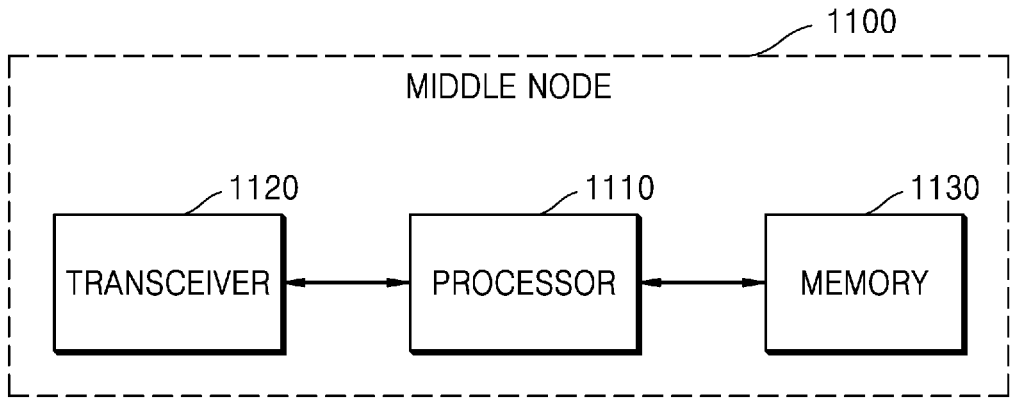
Figure 12:
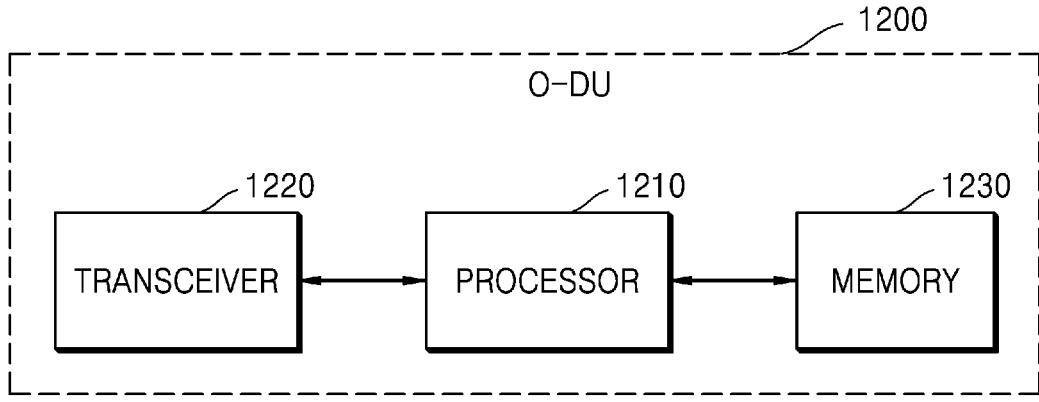
Figure 13:
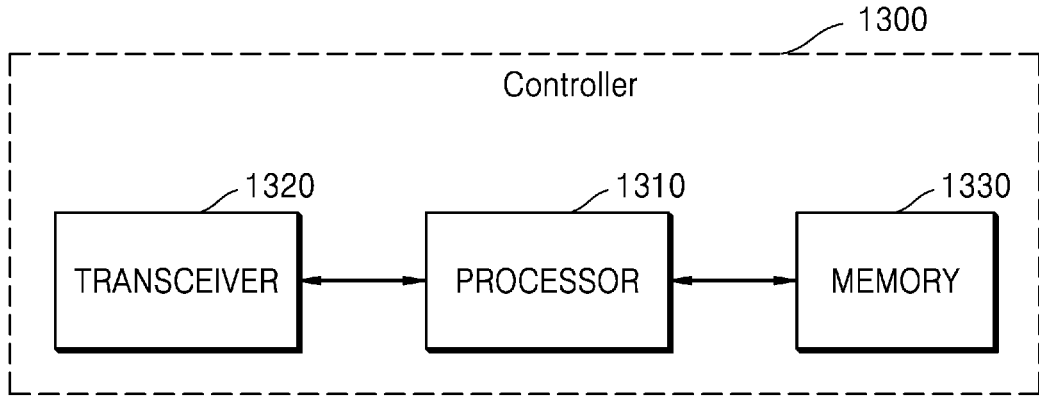

FIG. 11 is a view illustrating a configuration of a middle node according to an embodiment;

FIG. 12 is a view illustrating a configuration of an O-DU according to an embodiment; and FIG. 13 is a view illustrating a configuration of a controller according to an embodiment.

DETAILED DESCRIPTION

Hereinafter, embodiments will be described in detail with the accompanying drawings.

In the description of the embodiments, certain detailed explanations of a related function or configuration are omitted when it is deemed that they may unnecessarily obscure the essence of the disclosure. In addition, the terms described below are defined in consideration of the functions in the disclosure, and may vary depending on the intention or custom of a user or an operator. Therefore, the definition needs to be made based on content throughout this specification.

For the same reason, some components may be exaggerated, omitted, or schematically shown in the accompanying drawings. In addition, the size of each component does not entirely reflect its actual size. In each drawing, identical or corresponding components are given the same reference numerals.

The advantages and features of the disclosure and a method of achieving them will become clear by referring to the embodiments described in detail below along with the accompanying drawings. However, the disclosure is not limited to the embodiments disclosed below, but may be implemented in various different forms. The embodiments are provided to ensure that the description of the disclosure is complete and to fully inform one of ordinary skill in the art of the scope of the disclosure, and the claimed scope of the disclosure is only defined by the scope of the claims.

At this time, it will be understood that each block of processing flow charts and combinations of the processing flow charts may be performed by computer program instructions. Because these computer program instructions may be mounted on a processor of a general-purpose computer, special-purpose computer, or other programmable data processing equipment, the instructions performed through the processor of the computer or other programmable data processing device creates a unit to perform functions described in flow chart block(s). These computer program instructions may also be stored in computer-usable or computer-readable memory that can be directed to a computer or other programmable data processing equipment to implement the functions in a particular manner. Accordingly, the instructions stored in the computer-usable or computer-readable memory may also produce manufactured items containing an instruction unit that performs the functions described in the flow chart block(s). Because the computer program instructions can be mounted on a computer or other programmable data processing equipment, instructions that execute a computer or other programmable data processing equipment by performing a series of operations on a computer or other programmable data processing equipment to generate a computer-executable process may also provide operations for executing the functions described in the flow chart block(s).

In addition, each block may represent a module, segment, or portion of code containing one or more executable instructions for executing specified logical function(s). In addition, in some Alternative implementations, it is possible for functions mentioned in the blocks to occur out of order. For example, two blocks shown in succession may be performed substantially simultaneously, or the blocks may sometimes be performed in reverse order depending on their corresponding functions.

The term "unit or part" used in the disclosure refers to software or hardware components such as a field-programmable gate array (FPGA) or an application specific integrated circuit (ASIC), and the "unit or part" may be configured to perform specific roles. However, the "unit or part" is not limited to software or hardware. The "unit or part" may be configured to be stored in an addressable storing medium or to execute one or more processors. Accordingly, the "unit or part" may include, for example, software components, object-oriented software components, components such as class components and task components, processors, formulas, attributes, procedures, subroutines, segments of program code, drivers, firmware, micro code, circuits, data, database, data structures, tables, arrays and variables. Functions provided in components and "units or parts" may be combined into a smaller number of components and "units or parts", or may be further divided into additional components and "units or parts." Furthermore, components and "units or parts" may be implemented to reproduce one or more CPUs within a device or a secure multimedia card. In addition, in an embodiment, "unit or part" may include one or more processors and/or devices.

In various embodiments, the technologies described in the disclosure and systems and devices for implementation thereof may utilize other radio access technologies such as WiFi or WiMax as well as radio access technologies such as code division multiple access (CDMA), time division multiple access (TDMA), frequency division multiple access (FDMA), orthogonal FDMA (OFDMA), single-carrier FDMA (SC-FDMA), LTE, a global system for mobile communications (GSM), 5G NR, and the like to support communication between networks (or systems).

Various other embodiments and features according to the disclosure will be further described later below. It should be apparent that the teachings herein may be implemented in a wide variety of forms and any particular structure, function, or both, disclosed herein are merely exemplary, and not limiting. Based on the teachings herein, one of ordinary skill in the art will appreciate that aspects disclosed herein may be implemented independently of any other aspects, and two or more of these aspects may be combined in various ways. For example, a device or a method may be implemented by using any number of aspects set forth herein. Furthermore, the device or the method may be implemented with structures and functions of one or more of the aspects described herein, or may be implemented by using structures and functions of other aspects. For example, the method may be implemented as part of instructions stored on a non-transitory computer-readable recording medium for execution on a system, a device, an apparatus and/or a processor, or a computer. Furthermore, one aspect may include at least one component of the claim.

Hereinafter, preferred embodiments will be described in detail with reference to the attached drawings. At this time, it should be noted that the same components in the attached drawings are indicated by the same symbols as much as possible. In addition, detailed descriptions of well-known functions and configurations that may obscure the gist of the disclosure will be omitted.

In describing the embodiments in this specification, descriptions of technical content that is well-known in the art and not directly related to the disclosure will be omitted. This is to convey the gist of the disclosure more clearly without obscuring it by omitting unnecessary explanation.

For the same reason, some components are exaggerated, omitted, or schematically shown in the accompanying drawings. In addition, the size of each component does not entirely reflect its actual size. In each drawing, identical or corresponding components are given the same reference numerals.

The advantages and features of the disclosure and a method of achieving them will become clear by referring to the embodiments described in detail below along with the accompanying drawings. However, the disclosure is not limited to the embodiments disclosed below, but may be implemented in various different forms. The embodiments are provided to ensure that the description of the disclosure is complete and to fully inform one of ordinary skill in the art of the scope of the disclosure, and the disclosure is only defined by the scope of the claims. Like reference numerals refer to like elements throughout.

At this time, it will be understood that each block of processing flow charts and combinations of the processing flow charts may be performed by computer program instructions. Because these computer program instructions may be mounted on a processor of a general-purpose computer, special-purpose computer, or other programmable data processing equipment, the instructions performed through the processor of the computer or other programmable data processing device creates a unit to perform functions described in flow chart block(s). These computer program instructions may also be stored in computer-usable or computer-readable memory that can be directed to a computer or other programmable data processing equipment to implement the functions in a particular manner. Accordingly, the instructions stored in the computer-usable or computer-readable memory may also produce manufactured items containing an instruction unit that performs the functions described in the flow chart block(s). Because the computer program instructions can be mounted on a computer or other programmable data processing equipment, instructions that execute a computer or other programmable data processing equipment by performing a series of operations on a computer or other programmable data processing equipment to generate a computer-executable process may also provide operations for executing the functions described in the flow chart block(s).

In addition, each block may represent a module, segment, or portion of code containing one or more executable instructions for executing specified logical function(s). In addition, in some Alternative implementations, it should be noted that functions mentioned in blocks may occur out of order. For example, two blocks shown in succession may be performed substantially simultaneously, or the blocks may sometimes be performed in reverse order depending on their corresponding functions.

At this time, the term "unit or part" used in this embodiment refers to software or hardware components such as FPGA or ASIC, and the "unit or part" performs certain roles. However, the "unit or part" is not limited to software or hardware. The "unit or part" may be configured to be stored in an addressable storing medium or to reproduce one or more processors. Accordingly, the "unit or part" may include, for example, software components, object-oriented software components, components such as class components and task components, processors, formulas, attributes, procedures, subroutines, segments of program code, drivers, firmware, micro code, circuits, data, database, data structures, tables, arrays and variables. Functions provided in components and "units or parts" may be combined into a smaller number of components and "units or parts", or may be further divided into additional components and "units or parts." Furthermore, components and "units or parts" may be implemented to reproduce one or more CPUs within a device or a secure multimedia card.

Hereinafter, a base station is an entity that performs resource allocation for a terminal and may be at least one of a Node B, base station (BS), eNode B (eNB), gNode B (gNB), a radio access unit, a base station controller, or a node on a network. The terminal may include user equipment (UE), a mobile station (MS), a cellular phone, a smartphone, a computer, or a multimedia system capable of performing communication functions. In addition, the embodiment described below may be applied to other communication systems having a similar technical background or channel type as the embodiment. In addition, the embodiment may be applied to other communication systems through some modifications without significantly departing from the scope of the disclosure, at the discretion of one of ordinary skill in the art.

Terms used in the following description, such as terms for identifying a connection node, terms referring to network entities or network functions (NFs), terms referring to messages, terms referring to interfaces between network objects, and terms referring to various identification information, are provided as examples for convenience of explanation. Therefore, the disclosure is not limited to the terms described below, and other terms referring to objects having equivalent technical meaning may be used.

For convenience of explanation below, some terms and names defined in 3rd generation partnership project (3GPP) long-term evolution (LTE), Internet engineering task force (IETF) and IEEE 802 Project standards may be used. However, the disclosure is not limited by the above terms and names, and may be equally applied to systems according to other standards.

Hereinafter, various embodiments will be described in detail in order.

An O-RAN distributed unit (O-DU) may be a part of an open-RAN (O-RAN) system, typically implemented in software. In more detail, the O-DU may be a logical node hosting an RLC/MACI High-PHY layer based on lower layer functional split. An O-RAN radio unit (O-RU) may be a logical node that hosts a Low-PHY layer and RF processing based on lower layer functional split. The O-RU may perform the role of transmitting and receiving radio signals, which is the biggest feature of 3GPP's "TRP" or "RRH".

User Equipment (UE) is a device, such as a mobile phone, that allows a user to access a network service.

An uplink (UL) refers to a traffic flow through different network components from the UE to a network and from the O-RU to the O-DU. An interface from the UE to the O-RU is wireless, while a UL traffic from the O-RU to the O-DU may take various forms (e.g., Ethernet connection) such as wireless and wired.

A downlink (DL) refers to a traffic flow through network components from the O-DU to the O-RU and from the network to the UE. A fronthaul interface from the O-DU to the O-RU may have various forms (e.g., Ethernet) such as wired or wireless, while an interface from the O-RU to the UE may be a wireless interface.

The O-RAN specification may include four planes: user plane (U-plane), control plane (C-plane), synchronization plane (S-plane), and management plane (M-plane).

The U-plane may be a concept that includes IQ sample data transmitted between the O-DU and the O-RU.

The C-plane is a concept that specifically refers to scheduling information, beamforming information transfer, and other real-time control between the O-DU and the O-RU, and may be distinguished from a UE's control plane.

The S-plane generally includes time and frequency synchronization configuration and information exchange, and may include other network elements in addition to the O-DU and the O-RU.

The M-plane is a concept that represents a non-real-time management operation for the O-RU. The non-real-time management operation may be executed bidirectionally by O-RU and O-RU controllers, and the O-RU controller may reside in the O-DU or a service management and orchestration system (SMO), or may exist separately.

An M-plane interface is a link between the O-RU controller and the O-RU to exchange non-real-time management information.

The section type is a delimiter of a C-plane message format and consists of different data fields depending on the purpose, such as scheduling format, beamforming information configuration format, ACK/NACK instruction response, and LAA information exchange.

Section extension data is optional additional information attached to the end of section data in a C-plane message that mainly flow from the O-DU to the O-RU, and may transmit additional real-time control information to achieve optimization or support objectives that cannot be achieved in a normal configuration format.

A shared cell may represent a method in which multiple O-RUs operate as being included in an identical cell with one or multiple component carriers.

The O-DU and the O-RU may be classified according to the presence or absence of multiple network elements and links (data flow) as shown in Table 1 below.

TABLE 1

| Cell type classification according to the number and configuration of DU and RU | | | | | |
|---|---|---|---|---|---|
| Cell type | 1 | 2A | 2B | 3 | 4 |
| Terms | Cell | Shared Cell | Shared Cell | Shared O-RU | Shared Cell, Shared O-RU |
| DU | 1 | 1 | 1 | 2 or more | 2 or more |
| RU | 1 | 2 or more | 2 or more | 1 | 2 or more |
| Uplan-DL | Single link | Copy | Copy | Single link | Hybrid |
| Uplan-UL | Single link | Combine | Multi-link | Single link | Hybrid |

Starting from the premise of an acceptable configuration without additional implementation and major changes to the UE, basically, the UE does not distinguish between shared cells and non-shared cells and recognizes them as existing cells. Therefore, regardless of the cell type, the identity of a cell is maintained as one. When the base station consists of multiple O-RUs, an excellent propagation environment may be provided by minimizing interference between radio signals such as a broadcasting channel such as SIB1 and a control channel such as group common PDCCH provided as a single layer within the cell.

However, in a shared cell, some signals, such as synchronization signal (SS)/physical broadcast channel (PBCH) and channel state information-reference signal (CSI-RS), may be allocated to O-RUs individually or in groups to support position and selective operation. Therefore, individual O-RUs in a shared cell are not intended to always behave the same.

In terms of O-DU, cell type 2A (shared cell) has basically the same operating principle as cell type 1. However, due to the configuration of multiple O-RUs, differences occur in expected performance of a cell and requirements for cell configuration. In terms of radio signal quality, there is an increase in noise power proportional to the number of O-RUs in a UL signal. In terms of message handling, like cell type 1, all network entities process them as a single message, and thus, a function of copying a DL directional message and combining an UL directional message in the middle of a link between the O-DU and the O-RU is required. Combine may be a concept that includes expressions such as sum, aggregate, and add. In O-RAN, a fronthaul multiplexer (FHM) or cascade O-RU is defined as a network node responsible for the function.

In an FHM mode, a shared cell may be configured to deploy an FHM function between at least one O-DU and multiple O-RUs. The FHM function may perform copy and combine functions, and like a general O-RU, may also support an LLS fronthaul. Combination may include expressions such as combine, sum, aggregate, and add. Multiple O-RUs connected to the FHM may all share one cell, and may be designed to be divided into multiple cells and shared by group.

A cascade mode may be configured in such a way that there is one O-RU directly connected to the O-DU, and O-RUs are connected to each other in series.

Figure 1A:
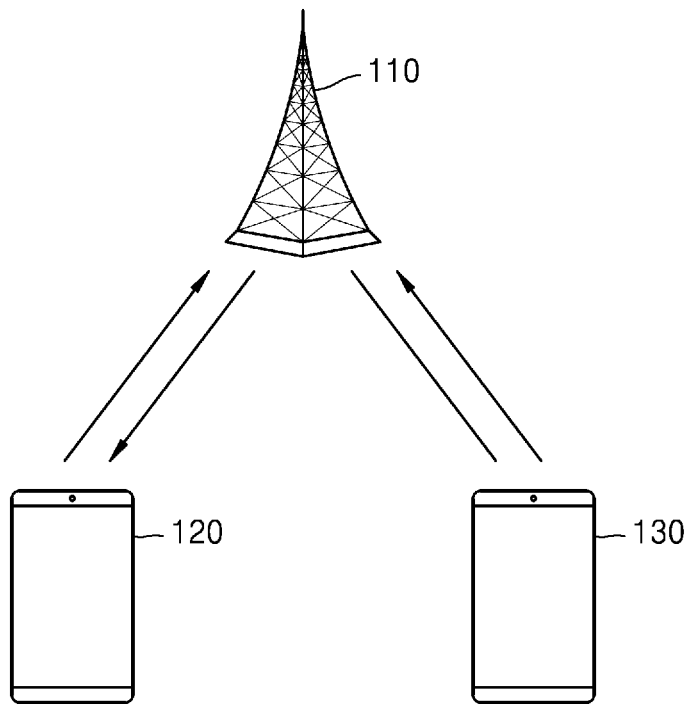
FIG. 1A is a view of a wireless communication system according to various embodiments.

FIG. 1A is a view of a wireless communication system according to various embodiments. FIG. 1A illustrates a base station 110, a terminal 120, and a terminal 130 as some of nodes that use a wireless channel in the wireless communication system. FIG. 1A shows only one base station, but other base stations identical or similar to the base station 110 may be further included.

The base station 110 is a network infrastructure that provides radio access to the terminals 120 and 130. The base station 110 has coverage defined as a certain geographic area based on a distance over which signals can be transmitted. The base station 110 may be referred to as "access point (AP)", "eNodeB (eNB)", "5th generation node (5G node)", generation "next nodeB (gNB)", "wireless point", "transmission/reception point (TRP)", or other terms with equivalent technical meaning.

Each of the terminal 120 and terminal 130 is a device used by a user and communicates with the base station 110 through a wireless channel. A link from the base station 110 to the terminal 120 or terminal 130 is called a downlink (DL), and a link from the terminal 120 or the terminal 130 to the base station 110 is called an uplink (UL). In addition, the terminal 120 and the terminal 130 may communicate with each other through a wireless channel. In some cases, at least one of the terminal 120 and the terminal 130 may be operated without user involvement. In other words, at least one of the terminal 120 and the terminal 130 is a device that performs machine type communication (MTC) and may not be carried by a user. Each of the terminal 120 and the terminal 130 may be referred to as "user equipment (UE)", "customer premises equipment (CPE)", "mobile station", "subscriber station", "remote terminal", "wireless terminal", "electronic device", "user device", or other terms having equivalent technical meaning.

Conventionally, in a communication system with a relatively large cell radius of base stations, each base station is installed to include functions of a digital processing unit (or digital unit (DU)) and a radio frequency (RF) processing unit (or radio unit (RU)). However, as higher frequency bands are used in 4th generation (4G) and/or later communication systems and the cell radius of base stations becomes smaller, the number of base stations to cover a specific area increases, and an installation cost burden on an operator to install the increased number of base stations increases. In order to minimize the installation cost of a base station, a structure has been proposed in which the DU and the RU of the base station are separated, one or more RUs are connected to one DU through a wired network, and one or more geographically distributed RUs are deployed to cover a specific area.

Figure 1B:
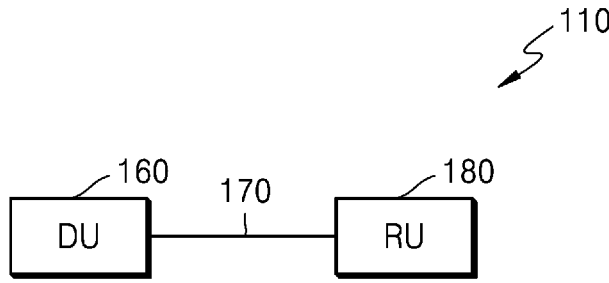
FIG. 1B is a view illustrating an example of a fronthaul structure according to functional split of a base station, according to various embodiments.

FIG. 1B is a view illustrating an example of a fronthaul structure according to functional split of a base station, according to various embodiments. A fronthaul refers to a link between entities between a wireless LAN and the base station, unlike a backhaul between the base station and a core network.

Referring to FIG. 1B, the base station 110 may include a DU 160 and an RU 180. The fronthaul 170 between the DU 160 and the RU 180 may be operated through an Fx interface. For operation of the fronthaul 170, for example, an interface such as enhanced common public radio interface (eCPRI) or radio over Ethernet (ROE) may be used.

As communication technology develops, mobile data traffic increases, and accordingly, a bandwidth requirement for a fronthaul between a DU and an RU increases significantly. In deployment such as a centralized/cloud radio access network (C-RAN), the DU may be implemented to perform functions for packet data convergence protocol (PDCP), radio link control (RLC), and medium access control (MAC), and the RU may be implemented to further perform functions for a PHY layer in addition to an RF function.

The DU 160 may be responsible for an upper layer function of a wireless network. For example, the DU 160 may perform a function of an MAC layer and a portion of the PHY layer. A portion of the PHY layer is performed at a higher level from among the functions of the PHY layer and may include, for example, channel encoding (or channel decoding), scrambling (or descrambling), modulation (or demodulation), or layer mapping (or layer demapping). According to an embodiment, when the DU 160 complies with an O-RAN standard, the DU 160 may be referred to as an O-RAN DU (O-DU). The DU 160 may be represented as a replacement for a first network entity for a base station (e.g., gNB) in embodiments, as needed.

The RU 180 may be responsible for a lower layer function of a wireless network. For example, the RU 180 may perform a portion of the PHY layer and an RF function. A portion of the PHY layer is performed at a relatively lower level than the DU 160 from among the functions of the PHY layer and may include, for example, IFFT conversion (or FFT conversion), CP insertion (CP removal), and digital beamforming. An example of this specific functional split will be described in detail in FIG. 4. The RU 180 may be referred to as "access unit (AU)", "access point (AP)", "transmission/reception point (TRP)", "remote radio head (RRH)", "radio unit (RU)", or other terms having equivalent technical meaning. According to an embodiment, when the RU 180 complies with an O-RAN standard, the RU 180 may be represented as a replacement for a second network entity (e.g., another FHM) for a base station (e.g., gNB) in embodiments, as needed.

In fronthaul communication between the DU 160 and the RU 180, the RU 180 needs to continuously perform radio transmission and reception specified in 3GPP TS within an error range specified for time and frequency resources (e.g., frequency time error, time alignment error, etc.). To this end, timing and latency of the network infrastructure are managed for each network element, and in particular, DU and RU that handle physical layer signal processing require strict timing control and high accuracy. Because functional split option 7 performs signal processing on a per-symbol basis, IQ data corresponding to each symbol and its processing information need to be transferred between the DU 160 and RU 180 before certain latency. A message arrival time may have a relationship as shown in the formula below, which is determined by a transmission time and delay.

$$\text{Transmission point in time(window)+delay} \\ \text{time=arrival point in time(window)}$$

$$\text{Transmit window+transport delay<=receive window}$$

Usually, there is a DU's fixed timing processing method that secures a sufficient margin for transmission delay based on timing of the RU 180, and a DU's dynamic timing processing method that takes advantage of an additional time secured by varying timing of message transmission and reception in response to a fronthaul transmission delay. The processing method is determined by the DU 160 because it depends on a message timing management capability of the DU 160. Because it is generally advantageous for the RU 180 to process in the shortest period of time with optimal resources, the RU 180 provides a delay profile according to a certain standard. This standard can be sub-carrier spacing, bandwidth, FH line rate, buffer depth, transport flow, etc. Because there are too many parameters between the DU 160 and the RU 180 for delay management of messages, optimization based on consultation between vendors based on use cases is generally expected, rather than a convergence process based on general requirements and relationships. Even if a dynamic timing processing method of the DU 160 is used, this means a dynamic change according to a use case and deployment, and does not mean a dynamic change to a delay that changes dynamically in an already configured cell. It is possible to expand the method to respond semi-statically while accompanied by service deterioration, but there is currently no significant advantage.

O-RAN message timing is managed so that the DU 160 and RU 180 may transmit and receive data smoothly in relation to a transport delay. A UL combining function of U-plane message for FHM and Cascade O-RU may operate based on ta3-prime-max based on the current reference timing tul=0. Ta3-prime-max may be determined by considering Ta4-max and FH transport delay in the DU.

Figure 2:
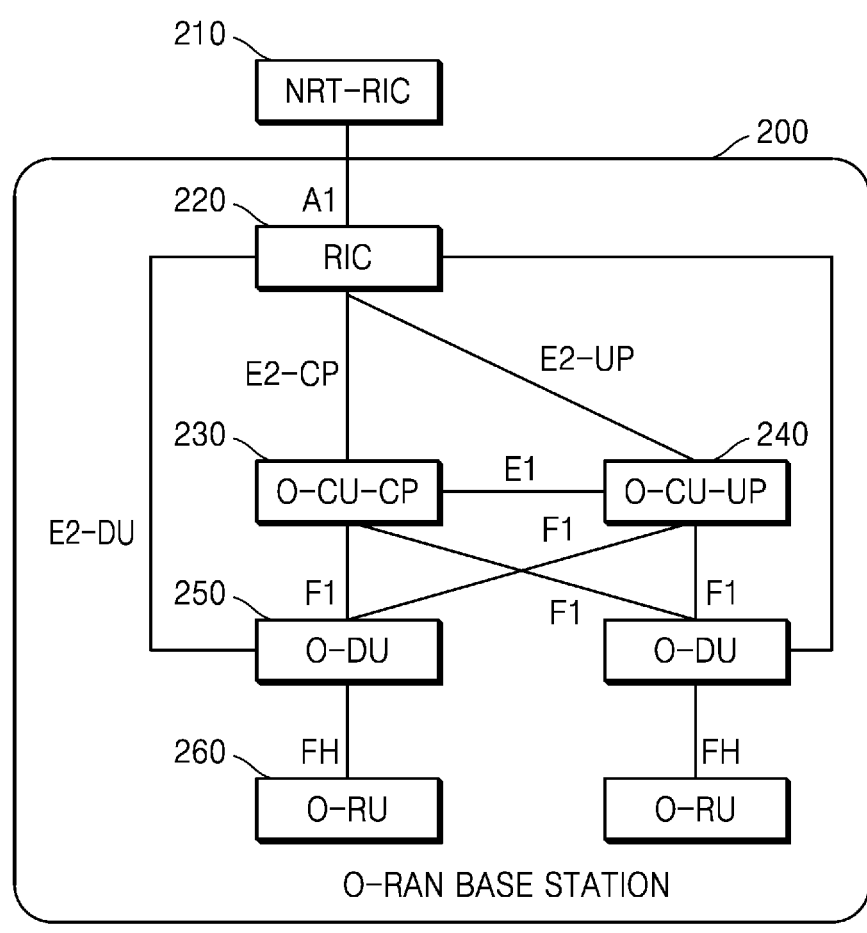
FIG. 2 is a view of an O-RAN network system according to an embodiment.

FIG. 2 is a view of an O-RAN network system according to an embodiment. According to FIG. 2, an O-RAN network is a network that logically separates functions of eNB and gNB of existing 4G and 5G systems, and may be defined as a non-real-time (NRT)-RAN intelligent controller (RIC) 210, an RIC 220 within an O-RAN base station 200, O-CU-CP 230, O-CU-UP 240, O-DU 250, O-RU 260, etc. in an O-RAN related standard. The NRT-RIC 210 is a logical node that enables non-real-time control, optimization of RAN elements and resources, model training and updates, etc. The RIC 220 is a logical node that centrally deploys servers in one physical location and enables near-real-time control and optimization of RAN elements and resources based on data collected from the O-DU 250, the O-CU-CP 230, the O-CU-UP 240, etc. through an E2 interface. The O-CU including the O-CU-CP 230 and the O-CU-UP 240 is a logical node that provides functions of radio resource control (RRC), service data adaptation protocol (SDAP), and packet data convergence protocol (PDCP). The O-CU-CP 230 is a logical node that provides functions of a C-plane portion of the RRC and PDCP, and the O-CU-UP 240 is a logical node that provides functions of a U-plane portion of the SDAP and PDCP. The O-CU-CP 230 may be connected to an access and mobility management function (AMF) included in a 5G network (5G core) and an NGAP interface. The O-DU 250 is a logical node that provides functions of RLC, MAC, and high physical layer (high-PHY), and the O-RU 260 connected to the O-DU 250 is a logical node that provides low-PHY functionality and RF processing. In FIG. 2, each logical node is shown as a single logical node, but a plurality of logical nodes are also possible. For example, multiple O-RUs 260 may be connected to one O-DU 250, and multiple O-DUs 250 may be connected to one O-CU-UP 240.

The disclosure is not limited by the name of each node described above, and the configuration of the disclosure may be applied to any logical node or entity that performs the function described above. In addition, the logical node may be physically located in the same location or a different location, and its function may be provided by the same physical device (e.g., processor, control unit, etc.) or a different physical device. For example, the function of at least one logical node described above may be provided through virtualization in one physical device. Hereinafter, an O-DU may be expressed interchangeably with a DU, and an O-RU may be expressed interchangeably with an RU.

Figure 3:
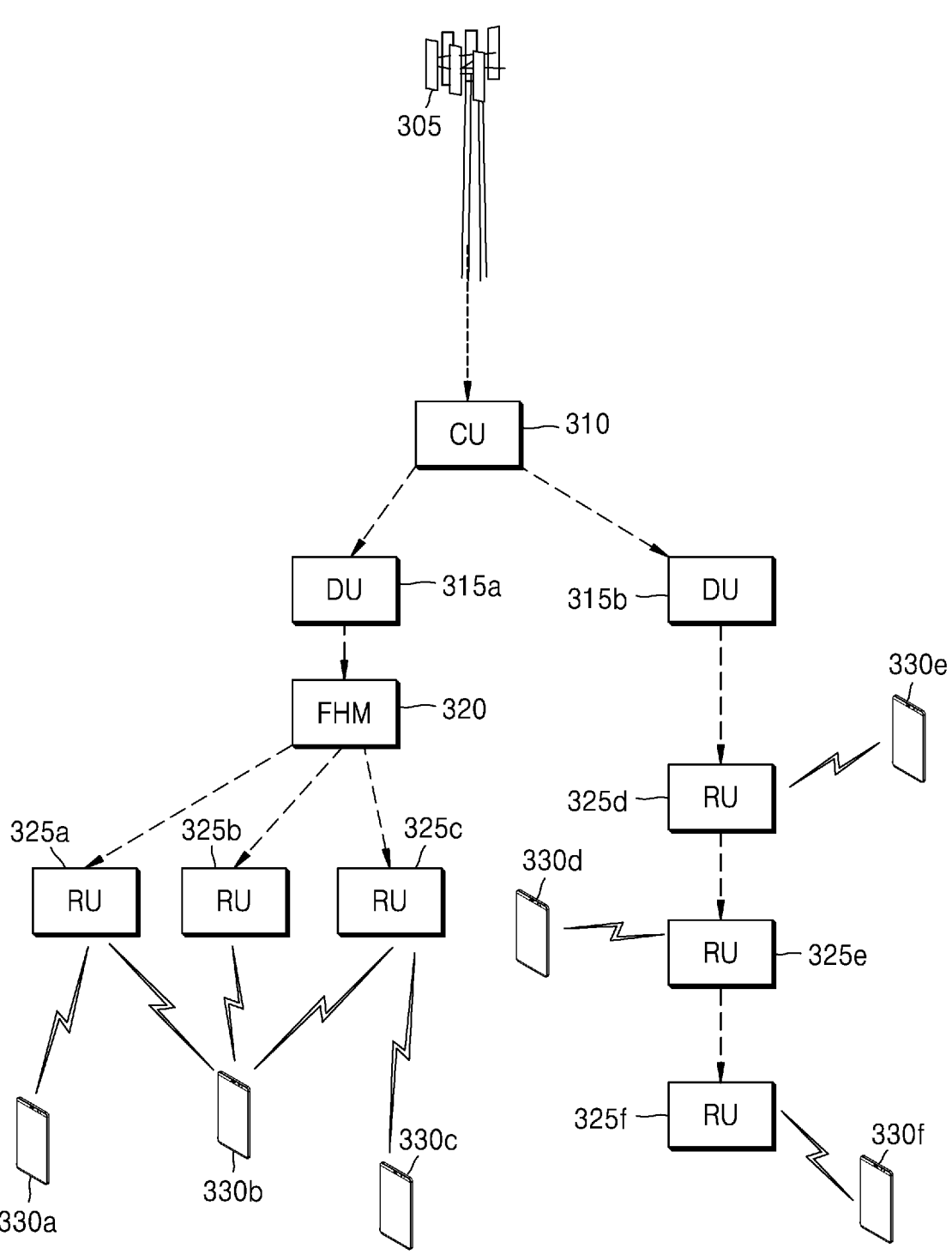
FIG. 3 is a view of a structure of an O-RAN wireless communication system according to an embodiment.

FIG. 3 is a view of a structure of an O-RAN wireless communication system according to an embodiment. The wireless communication system may include a base station 305 and at least one UE (330a, 330b, . . . , 330f). The base station may include a CU 310, at least one DU 315a or 315b, an FHM 320, and at least one RU (325a, 325b, 325f). The CU, DU, FHM, and RU may all be included in a base station or exist as entities with separate functions.

In an embodiment, the wireless communication system may be a radio access network (RAN) such as an O-RAN. The RAN may include connection between UE and a network including a base station. The O-RAN may include all of functions and components within the RAN and may interoperate with other functions or components. Like a traditional RAN structure, the O-RAN may also use a CU/DU split structure. The RU may generally implement functions for transmitting, receiving, amplifying, and digitizing a radio frequency signal. In an embodiment, the RU may be located near an antenna and the DU. The CU may be located closer to a core network. The FHM may serve as an interface between the RU and the DU, and may multiplex or demultiplex information received from the RU before providing information to the DU. The CU 310, DU, FHM, and RU may be expressed as O-CU, O-DU, O-FHM, and O-RU, respectively.

In an O-RAN architecture, a shared cell structure may include an RU combining an I/Q sample to an incoming sample before transmitting the I/Q sample from the RU to the DU. In the O-RAN architecture utilizing CU/DU split, the structure may be defined in two modes.

A first mode is an FHM mode, and the FHM 320 may retrieve compressed information along with the I/Q sample through signaling from all connected O-RUs 325a, 325b, and 325c. A plurality of O-RUs are connected to the FHM, and each RU may be associated with one or more UEs or perform wireless communication.

A second mode may be defined as a cascade mode (or a cascade O-RU mode). Cascade O-RUs 325d and 325e may retrieve compressed information along with the I/Q sample through messaging from a South node O-RU (e.g., trailing O-RU or downstream O-RU). An upstream O-RU may perform combining to transmit the I/Q sample to the next RU or DU.

Figure 4:
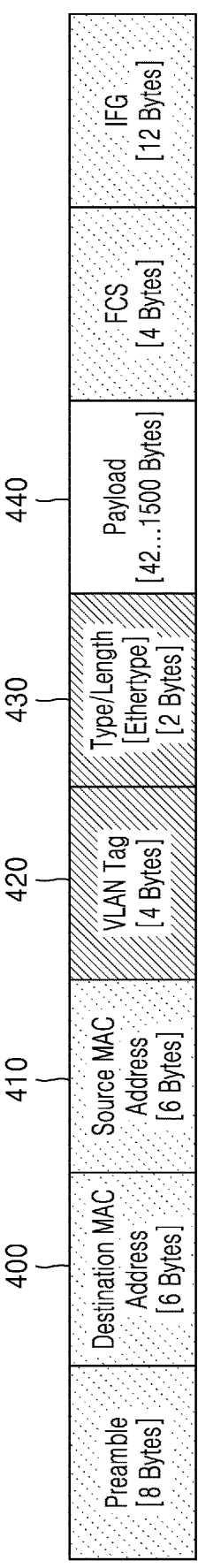
FIG. 4 is a view of a structure of an Ethernet message according to an embodiment.

FIG. 4 is a view of a structure of an Ethernet message according to an embodiment. A destination MAC address 400 in a header of the Ethernet message may indicate a public address of an RU in a case of DL, and may indicate a public address of a specific port of a channel card of a DU (the channel card may perform an MAC layer operation responsible for scheduling, a high-PHY operation, and an operation to convert a data format according to an interface between the RU and the DU) in a case of UL. A source MAC Address 410 may indicate the RU in a case of UL, and may indicate a public address of a specific port of the channel card of the DU in the case of DL.

A virtual LAN (VLAN) Tag 420 has a size of 4 bytes and allows management of C-plane, U-plane, and S-plane messages by mapping them to respective VLAN tags. A tag protocol identifier (TPID) included in the VLAN Tag 420 may be set to 16 bits and may be set to a value of 0×8100 to identify a frame as an IEEE 802.1Q tag frame. This field is located in the same position as that of an Ethertype/Length field in an untagged frame, so it can be used to distinguish an untagged frame from regular frames. Tag control information (TCI) included in the VLAN Tag may also be set to 16 bits and may include the following three fields. Priority code point (PCP) is 3 bits and may express priority of frames. A drop eligible indicator (DEI) may be set to 1 bit and is used separately or in combination with the PCP, and identifies frames that are desirable to be removed when traffic becomes congested. A VLAN identifier (VID) may be set to 12 bits and is a field that indicates which frame a VLAN belongs to. All values except reserved values 0×000 and 0xFFF may be used as VLAN identifiers, and up to 4,094 VLANs may be allowed. A reserved value 0×000 indicates that a frame does not belong to any VLAN. In this case, 802.1Q only specifies a priority and this priority may be referenced as a priority tag. Because Type/Length (Ethertype) is for eCPRI, it can be set to a fixed value of 0xAEFE.

A payload 440 may include a message according to each plane format, including an eCPRI header, as shown in FIG. 4. Content of each field or information of the Ethernet message described in relation to FIG. 4 does not necessarily have to be included all fields, and the disclosure may be performed by omitting the content or/and adding other fields as necessary.

FIGS. 5A and 5B are views illustrating an example of a C-plane message according to an embodiment. FIG. 5A may show a C-plane structure of section type 1, and FIG. 5B may show a C-plane structure of section type 3.

First, looking at each field in FIG. 5A, transport header 501 may include an eCPRI header shown in FIG. 4 or information according to IEEE-1914.3. dataDirection 502 indicates the direction of a U-Plane message, wherein 0 may indicate UL and 1 may indicate a DL. filterIndex 504 indicates a channel filter of an RU and may be set to 0×1. frameId 506 may indicate a specific frame in units of 10 ms. SubframeId 508 may indicate a specific subframe in units of 1 ms within a corresponding frame. slotId 510 may indicate a specific slot within a corresponding frame.

numberOfsections 514 may indicate the number of sections indicated by a corresponding message. In a case of SectionType 516, one C-plane message may have only one section type. In this example, the SectionType 516 may indicate section type 1. udCompHdr 518 may indicate an IQ bit width (bit) and compression method for IQ data in all sections of a corresponding message. In more detail, upper 4 bits may be iqWidth, indicating 1 to 16 bits, and lower 4 bits may be compMeth, indicating a compression method. 502 to 518 described above are application headers 540 that can be commonly applied to a corresponding message, and may be included in a similar structure in all C-plane messages.

A C-plane message of section type 1 may include information about an arbitrary section. SectionID 522 indicates an ID of the section, which may be used to match a C-plane message and a U-plane message. rb 524 indicates which PRB (physical resource block) is used, wherein 0 may indicate that all PRBs are used, and 1 may indicate that one PRB (every other PRB) is used. StartPrbc 526 is used to indicate the first PRB of a corresponding section, and numPrbc 528 may indicate the number of PRBs in a corresponding section. reMask 530 is a bit pattern that indicates an RE (resource element) (or subcarrier) corresponding to a specific beam in a corresponding PRB, and different beams may be applied within one PRB through reMask. numSymbol 532 may indicate the number of symbols corresponding to the section. The fields described above may be referred to as a section header 542 for each section.

In addition, the C-plane message may include section extension, and whether or not the section extension is included may be indicated by ef 520. Content of each field or information described in relation to FIG. 5A does not necessarily have to be included all fields, and the disclosure may be performed by omitting the content or/and adding other fields as necessary.

Referring to FIG. 5B, transport header to sectionType are the same as in FIG. 5A, but there is a difference in the next field. Timeoffset 550, framestructure 552, cpLength 554, and udCompHdr 556 are fields that can be checked in C-plane of section type 3. Timeoffset 550 defines a time offset from the start of a slot to the start of a cyclic prefix (CP). Framestructure 552 defines a frame structure, where the first 4 bits define the size of FFT/iFFT used for processing all IQ data associated with a C-plane message, and the remaining 4 bits define subcarrier spacing and the number of slots per 1 ms subframe. cpLength 554 indicates a length of the cyclic prefix. udCompHdr 556 defines a compression method and an IQ bitwidth for user data in a data section. Because most of the other fields are similar to FIG. 5A, their description will be omitted.

Figure 6A:
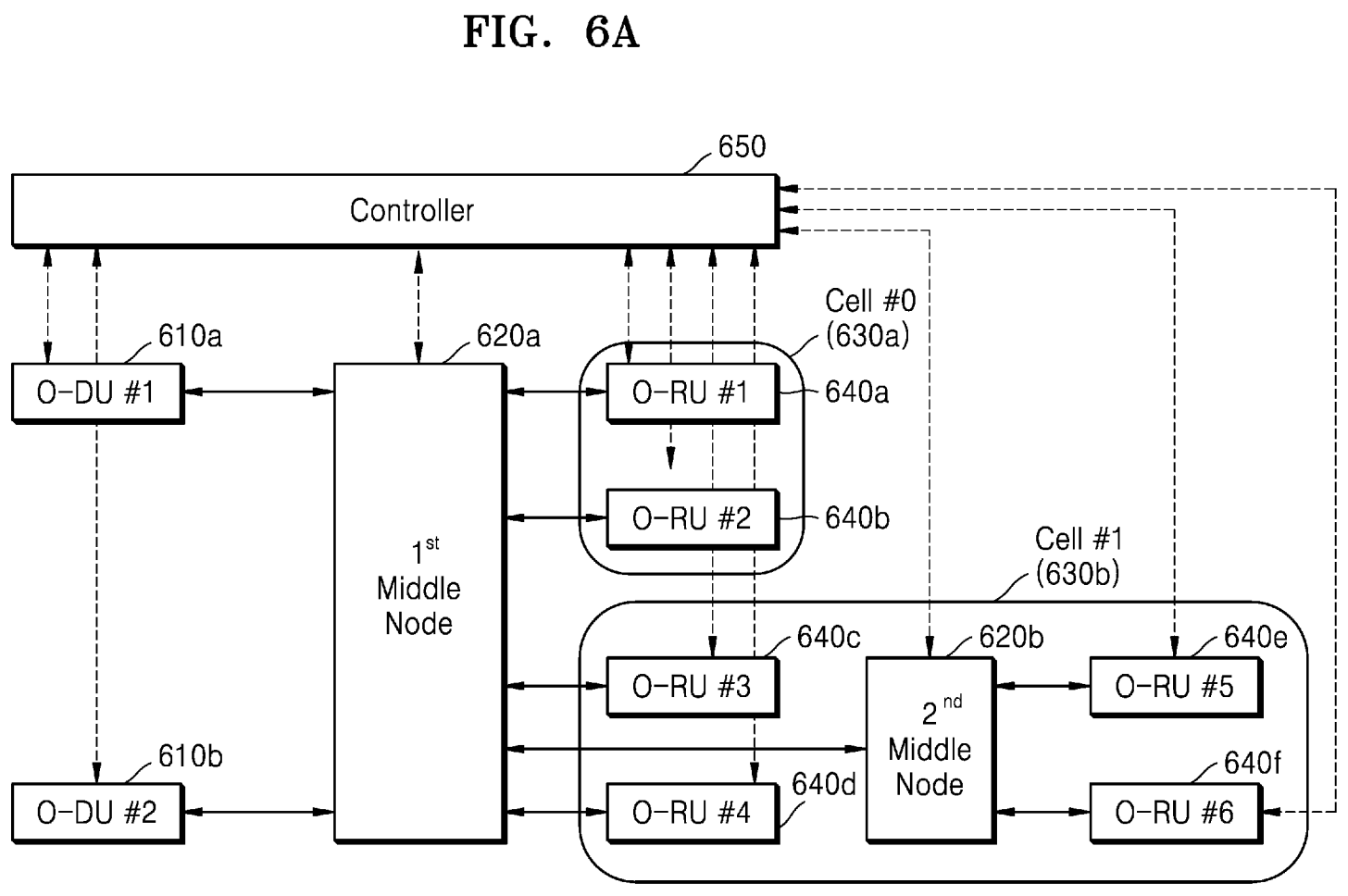

FIG. 6A is a view of a structure of an O-RAN base station including a middle node according to an embodiment.

Referring to FIG. 6A, an O-RAN base station (or network) 600 may include at least one O-DU 610a or 610b, middle nodes 620a and 620b, at least one O-RU (630a, 630b, . . . , 640f), and a controller 650.

The at least one O-DU 610a or 610b may also be called a northbound node centered on the first middle node 620a. The middle nodes 620a and 620b may be used interchangeably with an FHM 620a, a cascade FHM (not shown), or a cascade O-RU 620B. The at least one O-RU (640a, 640b, . . . , 640f) may be used interchangeably with a southbound node centered on the first middle node 620a. The controller 650 may have functions included in the O-DU 610a or 610b, or may exist as a separate device.

Referring to FIG. 6A, the controller 650 may perform direct communication with the at least one O-DU 610a or 610b, the middle nodes 620a and 620b, and the at least one O-RU (640a, 640b, . . . , 640f). The controller 650 may communicate an M-plane message with the at least one O-DU 610a or 610b. The controller 650 may communicate an M-plane message with the middle nodes 620a and 620b.

The at least one O-DU 610a or 610b may communicate a C/U-Plane message with the first middle node 620a. The at least one O-DU 610a or 610b may communicate a C/U-Plane message directly with the at least one O-RU (640a, 640b, . . . , 640f). The middle node may communicate with at least one O-RU included in at least one cell (cell #0 or cell #1) 630a or 630b. The first middle node 620a transmits the M-plane and C/U-plane messages received from the at least one O-DU 610a or 610b or the controller 650 to the at least one O-RU (640a, 6430b, . . . , 640f). At this time, the first middle node 620a may copy an identical message and transmit it to O-RUs included in each of the cells. For example, an identical message may be copied from the first middle node 620a and transmitted to O-RU #1 640a and O-RU #2 640b included in cell #0 630a, respectively. Different messages may be transmitted to cell #0 630a and cell #1 630b from the first middle node 620a, respectively. According to an embodiment, the second middle node 620b may be included inside the cell #1 630b. In this case, the second middle node 620b includes an O-RU southbound from the second middle node 620b, and may copy and transmit a message sent from the upper level to the corresponding O-RU. For example, cell #1 630b includes the second middle node 620b, and the second middle node 620b may copy and transmit data received from the first middle node 620a to O-RU #5 640e and O-RU #6 640f located southbound.

Referring to FIG. 6A, the at least one O-RU (640a, 640b, . . . , 640f) may transmit a U-plane message to the first middle node 620a based on data received from a terminal. The first middle node 620a may combine messages received from the at least one O-RU (640a, 640b, . . . , 640f). The combination may include expressions such as combine, sum, aggregate, and add. The first middle node 620a may combine messages received from the at least one O-RU (640a, 640b, . . . , 640f) and transmit them to the at least one O-DU 610a or 610b. At this time, the first middle node 620a may perform combining on data received from O-DUs included in an identical cell. According to an embodiment, the second middle node 620b may be included inside the cell #1 630b. In this case, the second middle node 620b includes an O-RU southbound from the second middle node 620b, and may combine messages received from the O-RU and transmit them to an upper level. For example, according to a cascade structure in cell #1 630b, the second middle node 620b may combine data received from O-RU #5 640e and O-RU #6 640f located at a lower level and transmit the data to the first middle node 620a at an upper level. The combination may include expressions such as combine, sum, aggregate, and add. The first middle node 620a may combine data received from the second middle node 620b and data received from O-RU #4 640d and transmit the data to the O-DU 610a or 610b.

Figure 6B:
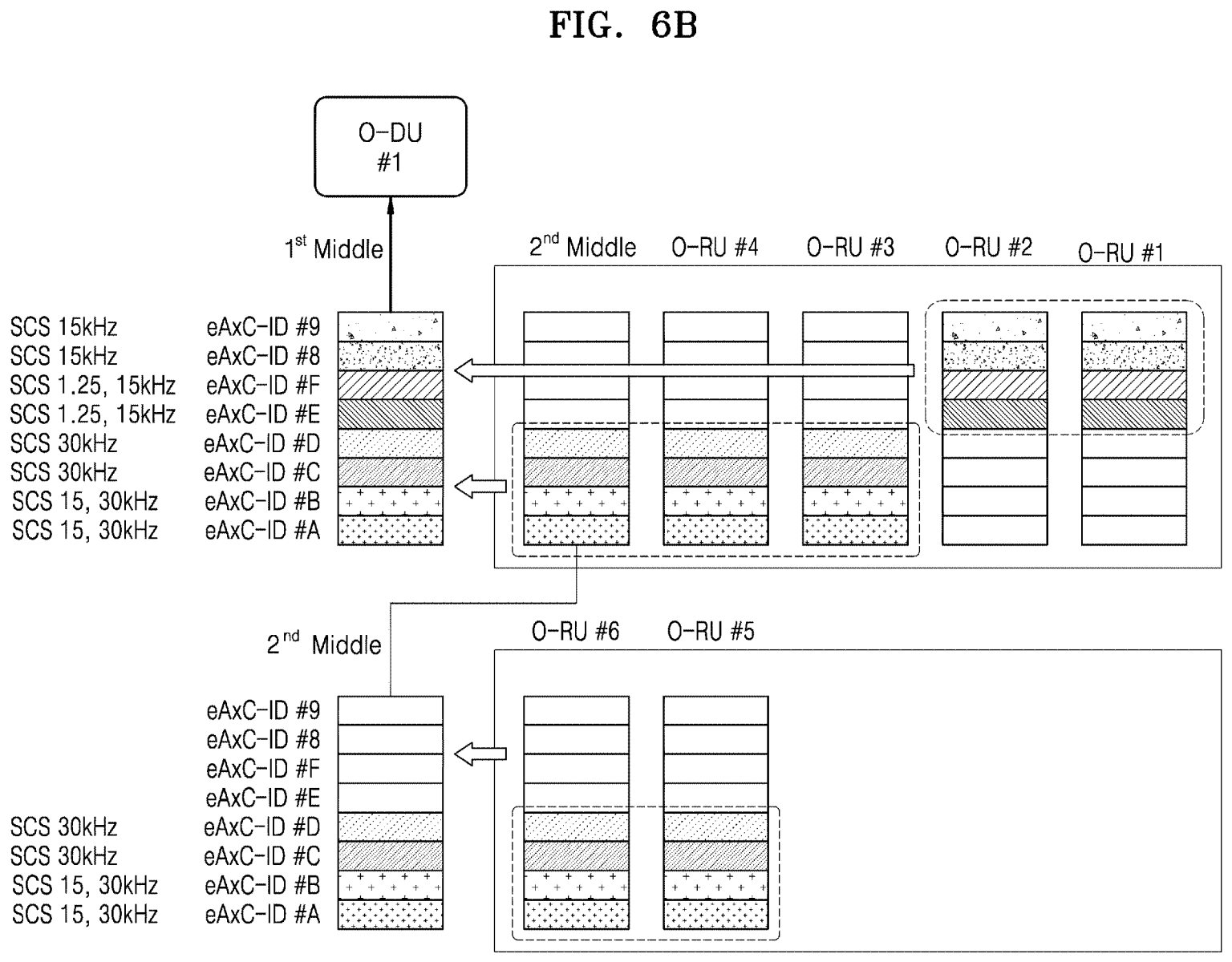

FIG. 6B is a view illustrating a situation in which pieces of uplink data transmitted from multiple O-DUs included in multiple cells are combined, according to an embodiment.

FIG. 6B may show that the first middle node described in FIG. 6A combines data from O-RU #1 640a and O-RU #2 640b included in cell #0 630a, and combines data from O-RU #3 640c, O-RU #4 640d, and the second middle node 620b included in cell #1 630b. The second middle node 620b may operate as a cascade O-RU that combines data from O-RU #5 640e and O-RU #6 640f, which are southbound nodes.

Referring to FIG. 6B, the data of O-RU #1 and O-RU #2 included in cell #0 has data in eAxC ID #F, eAxC ID #8, and eAxC ID #9. eAxC ID #8 and eAxC ID #9 are composed of the same SCS 15 KHz, and eAxC ID #F is composed of SCS 1.25 and 15 KHz and may include multiple SCS. eAxC ID #F may be a section type 3 message. Because the first middle node includes a single SCS for each single eAxC ID, data combination may be performed using a conventional method.

However, the data of O-RU #3, O-RU #4, and the second middle node included in cell #1 has data in eAxC ID #A, eAxC ID #B, eAxC ID #C, and eAxC ID #D, wherein eAxC ID #C and eAxC ID #D are composed of the same SCS 30 kHz, and eAxC ID #A and eAxC ID #B are composed of SCS 15 and 30 KHz and may include multiple SCSs. In this situation, eAxC ID #A and eAxC ID #B include multiple SCSs in one eAxC ID, which may cause problems in the middle node combining data.

In a case of an existing middle node, data including multiple SCSs are combined based on the same information and parameter. Accordingly, in multiple SCSs use cases, problems may arise such as some data being missing and combined or reducing an available fronthaul length. In addition, when multiple SCSs are included in one eAxC ID, there is a need for a method for a middle node to recognize this and perform combining efficiently and effectively.

Figure 7:
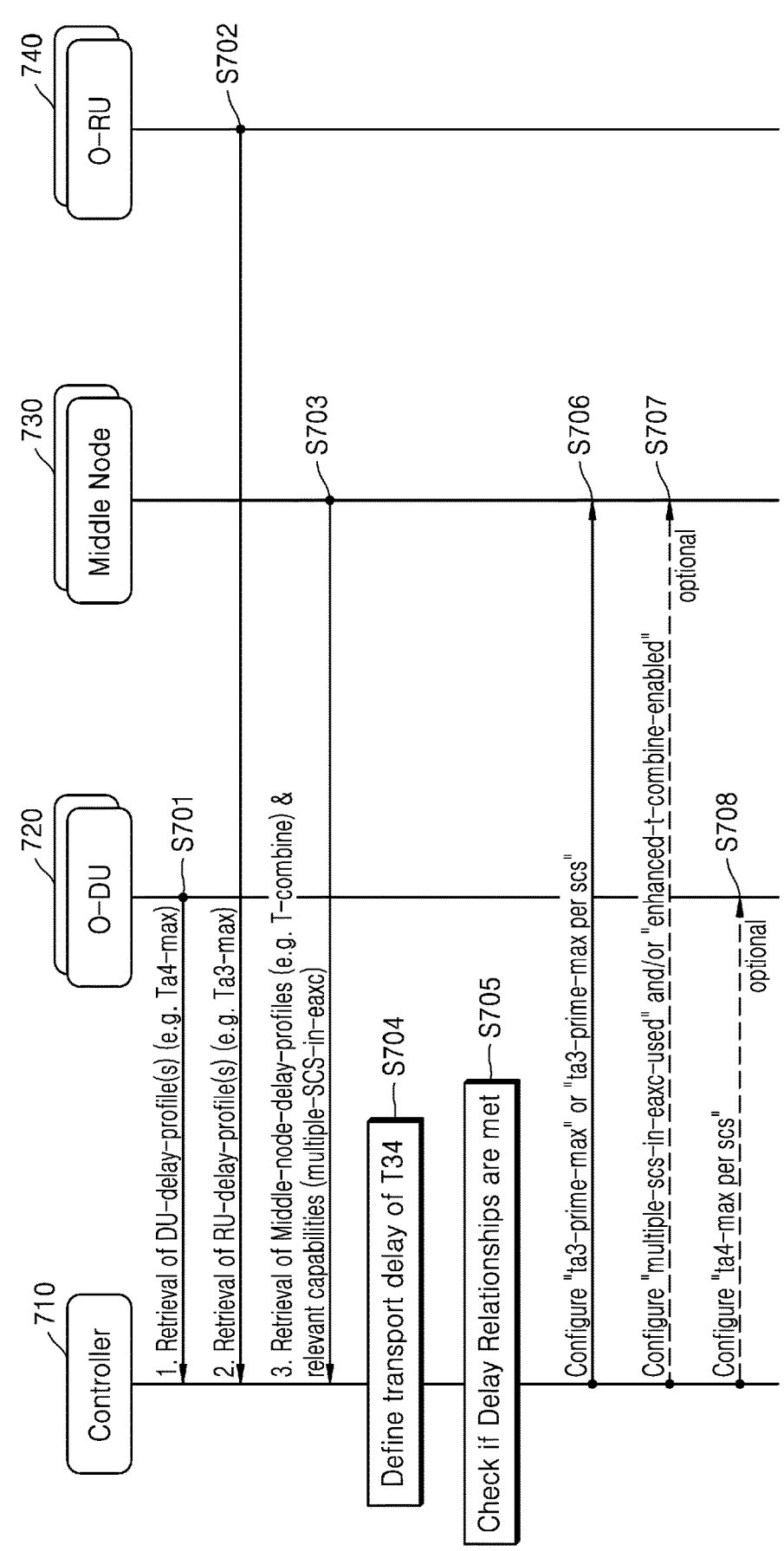
FIG. 7 is a view illustrating a method by which a middle node distinguishes and combines multiple SCSs in an uplink, according to an embodiment.

FIG. 7 is a view illustrating a method by which a middle node distinguishes and combines multiple SCSs in an uplink, according to an embodiment.

FIG. 8 is a table illustrating a data structure used when performing communication according to an embodiment. FIG. 8 may be a table showing part of a YANG model supported by an O-RAN standard.

A controller 710, at least one O-DU 720, a middle node 730, and at least one O-RU 740 in FIG. 7 may be the same as the controller 650, at least one O-DU 610a or 610b, middle nodes 620a and 620b, and at least one O-RU (640a, 640b, . . . , 640f) in FIG. 6.

Referring to FIG. 7, in operation S701, the controller 710 may request a DU delay profile from the O-DU 720. When the O-DU 720 receives a request for a DU delay profile from the controller 710, the O-DU 720 may transmit corresponding information. The DU delay profile may include timing from a time received at an RU's antenna to the O-DU, and a Ta4-max value.

In operation S702, the controller 710 may request an RU delay profile from the O-RU 740. When the O-RU 740 receives a request for an RU delay profile from the controller 710, the O-RU 740 may transmit corresponding information. The RU delay profile may include timing from a time received at an antenna to the O-RU, and a Ta3-max value.

In operation S703, the controller 710 may request information for combination from the middle node 730. The middle node 730 that has received a request for information for combining may transmit a maximum timing value (e.g., T-combine) required for the middle node to perform combining. In addition, optionally, when one eAxC ID includes multiple SCSs, the middle node 730 may transmit SCS capability information indicating capability information about whether the middle node 730 can distinguish and process the multiple SCSs to the controller 710. The controller 710 or O-DU 720 that has received the SCS capability information may check the information before setting multiple SCSs to one eAxC ID.

In operation S704, the controller 710 may determine timing required for an uplink for the related O-RU 740. In addition, the controller 710 may determine T34, which represents a timing value (or delay value) from the O-RU 740 to the O-DU 720. T34 may indicate a maximum delay time occurring in a wired fiber connected between the O-DU 720 and the O-RU 740.

In operation S705, the controller 710 may determine whether a delay relationship between the O-RU 740, middle node 730, and O-DU 720 is appropriate for data transmission and reception based on the DU delay profile, RU delay profile, maximum timing value required for the middle node to perform combining, SCS capability information, and determined T34 obtained in operations S701 to S703. The controller 710 may determine whether the delay relationship is appropriate for data transmission and reception based on whether the timings between the O-RU 740, middle node 730, and O-DU 720 are set to be included without overlap in the total allocated resources.

In operation S706, when the delay relationship between the O-RU 740, middle node 730, and O-DU 720 is determined to be appropriate for data transmission, the controller 710 may set a timing value at which data needs to be transmitted from the middle node 730 to the O-DU 720 (or upper node) or/and the latest timing (e.g., Ta3'-max) to be transmitted for each reference timing and transmit them to the O-DU 720 through an M-Plane. Alternatively, the controller 710 may transmit the Ta3'-max value from the O-DU 720 to the middle node 730 through an M-plane. According to an embodiment, when it is confirmed that the middle node 730 may process multiple SCSs in an identical eAxC in the SCS capability information received in operation S703, the controller 710 may set a timing value (e.g., Ta3'-max) for transmitting data from the middle node 730 to the O-DU 720, which is determined for each SCS that the middle node 730 may process, and may transmit the timing value to the middle node 730, or from the O-DU 720 to the middle node 730 through the M-plane. The middle node 730, which has received a timing value (e.g., Ta3-prime-max) for transmitting data from the middle node 730 to the O-DU 720, may determine when to perform a combination process based on a maximum timing value (e.g., T-combine) required for the middle node 730 to perform combining considering the timing. In addition, when determining when to perform combining, timing for waiting for a combining performance trigger or timing (e.g. T-waiting) for starting combining performance may be calculated.

In operation S707, the controller 710 may optionally set information (or indicator) (e.g., "multiple-scs-in-eaxc-used") to indicate that multiple SCSs may be used in one eAxC based on the DU delay profile, RU delay profile, maximum timing value required for the middle node to perform combining, SCS capability information, and determined T34 obtained in operations S701 to S703, include the information in the M-plane, and transmit the information to the middle node 730 or through the O-DU 720. When multiple SCSs are used in an eAxC when performing combining on data received from at least one O-RU 740 later, the middle node 730, which has received the above information (or indicator) (e.g., "multiple-scs-in-eaxc-used"), may distinguish them and perform combining. In addition, the controller 710 may transmit multiple types of SCS used in an eAxC ID in fronthaul communication through the M-plane.

In operation S708, the controller 710 may optionally set a timing value (e.g., Ta4-max) required for reception from an antenna according to an SCS to the O-DU as a whole or for each SCS based on the DU delay profile, RU delay profile, maximum timing value required for the middle node to perform combining, SCS capability information, and determined T34 obtained in operations S701 to S703, and transmit the timing value to the O-DU 720.

Referring to FIG. 8, "SCS" 805 may be the same as the information (e.g., "multiple-scs-in-eaxc-used") indicating that multiple SCSs may be used in one eAxC in FIG. 7. In the YANG model, a shared cell part may include "MULTIPLE-SCS-IN-EAXC (MULTIPLE-SCS-IN-EAXC-USED)" 815, which is information indicating that multiple SCSs may be used in one eAxC. In addition, "enhanced-t-combine-enabled" 810, which is information indicating that enhanced T-combine is available, may be included.

Referring to FIG. 8, in the YANG model, when multiple SCSs are used in shared-cell-combine-entities of shared-cell-combine-configuration in a shared-cell-mode of a shared-cell-config part and a common part of a shared-cell-combine-mode, the shared cell part may include information ("SCS") 805 indicating which SCS to be used.

Figure 9A:
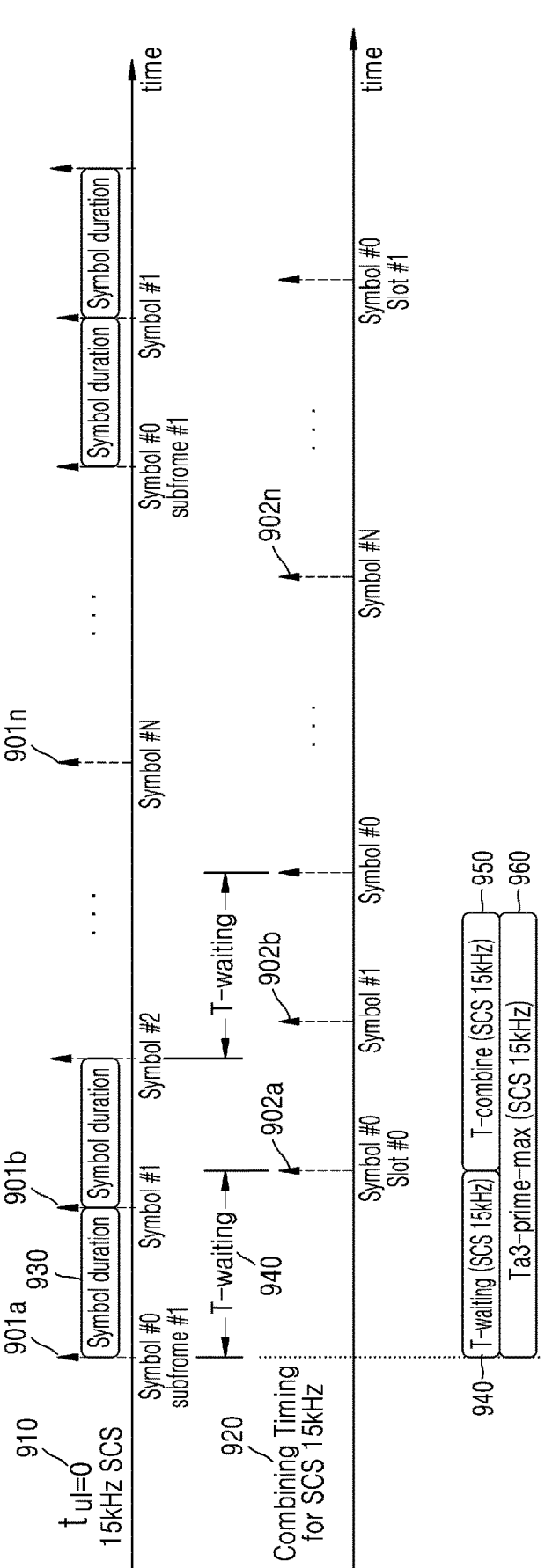
FIG. 9A is a view illustrating a method of performing combining on a single SCS, according to an embodiment.

FIG. 9A is a view illustrating a method of performing combining on a single SCS, according to an embodiment.

FIG. 9A may illustrate a method for a middle node to determine timing for combining uplink data when the SCS is 15 kHz. The method of FIG. 9A may represent a method performed in the middle node in FIGS. 1A to 8.

Referring to FIG. 9A, it can be seen that a diagram 910 shows timing at which uplink data in a time domain is received when reference timing tul=0. Symbol timings 901a, 901b, . . . , 901n are triggered at regular intervals depending on a value of SCS, and the interval between each symbol timing may be referred to as symbol duration 930. Uplink data may be received from a lower node to the middle node during the symbol duration 930.

A diagram 920 showing combining timing shows timing at which the middle node actually starts combining uplink data. Combine trigger timing #0 902a is timing corresponding to symbol timing #0 901a and may be determined as follows.

The middle node may consider a timing value (i.e., Ta3'-max) 960 at which data needs to be transmitted from the middle node to the O-DU, wherein the timing value is received from a controller or an O-DU through an M-plane. The timing value may be determined corresponding to the SCS. The middle node that receives the uplink data may calculate Ta3'-max 960 from each symbol timing 901a, and may use T-combine 950, a time required for the middle node to combine data to transmit data at corresponding timing, to determine combining timings 902a, 902b, . . . , 902n, which are timings at which combination needs to be initiated. Once the combining timings 902a, 902b, . . . , 902n are determined, a waiting time (T-waiting) 940 may be set from the symbol timings 901a, 901b, . . . , 901n to the combining timings 902a, 902b, . . . , 902n. When one eAxC ID consists of only one SCS, the middle node may perform combining by matching the eAxC ID and SCS and calling data for each eAxC ID.

For example, referring to FIG. 9A, the middle node may receive the timing value (i.e., Ta3'-max) 960 at which data needs to be transmitted from the corresponding middle node to the O-DU when the SCS is 15 KHz. The middle node may determine the combining timings 902a, 902b, . . . , 902n by corresponding the time (T-combine) 950 required to combine data when the SCS is 15 kHz to Ta3'-max 960. In addition, the waiting time (T-waiting) 940 for combining may be determined using the determined combining timings 902a, 902b, . . . , 902n and the symbol timings 901a, 901b, . . . , 901n.

The middle node may start combining at the most efficient and appropriate time by utilizing a timing value at which data received from the controller or O-DU through the M-plane needs to be transmitted from the middle node to the O-DU.

Figure 9B:
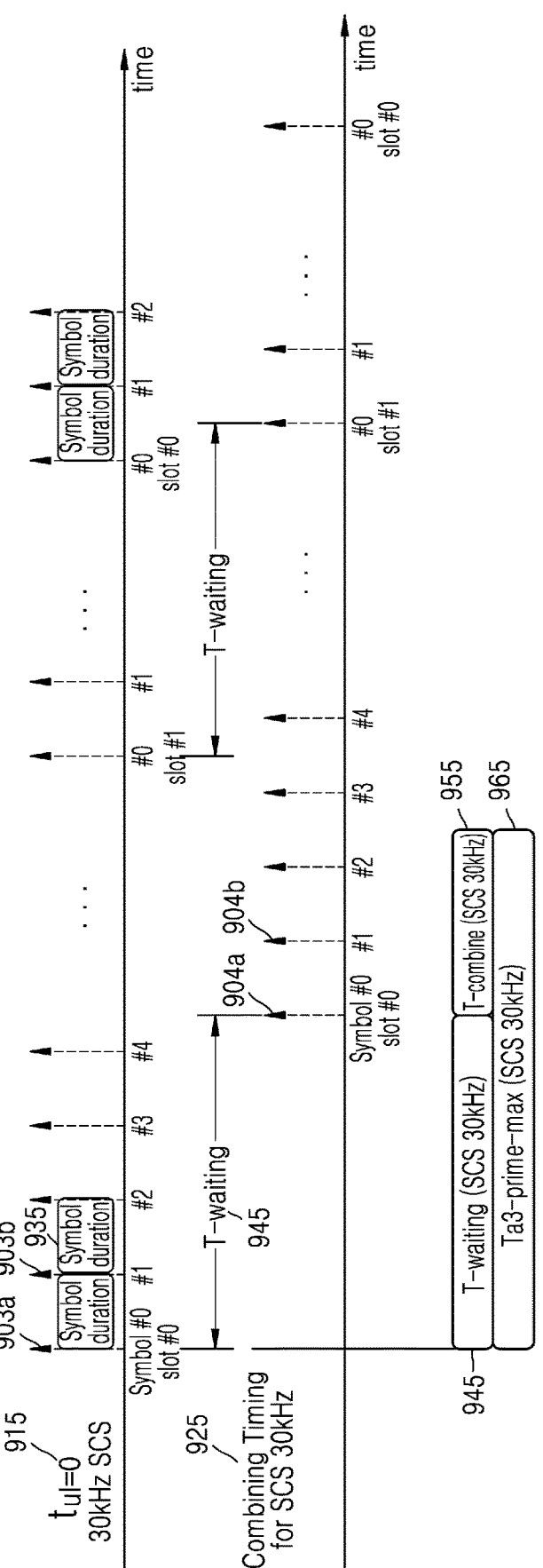
FIG. 9B is a view illustrating another method of performing combining on a single SCS, according to an embodiment.

FIG. 9B is a view illustrating another method of performing combining on a single SCS, according to an embodiment.

FIG. 9B may illustrate a method for a middle node to determine timing for combining uplink data when the SCS is 30 KHz. The method of FIG. 9B may represent a method performed in the middle node in FIGS. 1A to 8.

Referring to FIG. 9B, it can be seen that a diagram 915 shows timing at which uplink data in a time domain is received when reference timing tul=0. Symbol timings 903a, 903b, . . . , 903n are triggered at regular intervals depending on a value of SCS, and the interval between each symbol timing may be referred to as symbol duration 935. Uplink data may be received from a lower node to the middle node during the symbol duration 935.

A diagram 925 showing combining timing shows timing at which the middle node actually starts combining uplink data. Combine trigger timing #0 904a is timing corresponding to symbol timing #0 903a and may be determined as follows.

The middle node may consider a timing value (i.e., Ta3'-max) 965 at which data received from a controller or an O-DU through an M-plane needs to be transmitted from the middle node to the O-DU. The timing value may be determined corresponding to the SCS. The middle node that receives the uplink data may calculate Ta3'-max 965 from each symbol timing 903a, and may use T-combine 955, a time required for the middle node to combine data to transmit data at corresponding timing, to determine combining timings 904a, 904b, . . . , 904n, which are timings at which combination needs to be initiated. Once the combining timings 904a, 904b, . . . , 904n are determined, a waiting time (T-waiting) 945 may be set from the symbol timings 903a, 903b, . . . , 903n to the combining timings 904a, 904b, . . . , 904n.

For example, referring to FIG. 9B, the middle node may receive the timing value (i.e., Ta3'-max) 965 at which data needs to be transmitted from the corresponding middle node to the O-DU when the SCS is 30 KHz. The middle node may determine the combining timings 904a, 904b, . . . , 904n by corresponding the time (T-combine) 955 required to combine data when the SCS is 30 KHz to Ta3'-max 965. In addition, the waiting time (T-waiting) 945 for combining may be determined using the determined combining timings 904a, 904b, . . . , 904n and the symbol timings 903a, 903b, . . . , 903n.

The middle node may start combining at the most efficient and appropriate time by utilizing a timing value at which data received from the controller or O-DU through the M-plane needs to be transmitted from the middle node to the O-DU.

Figure 9C:
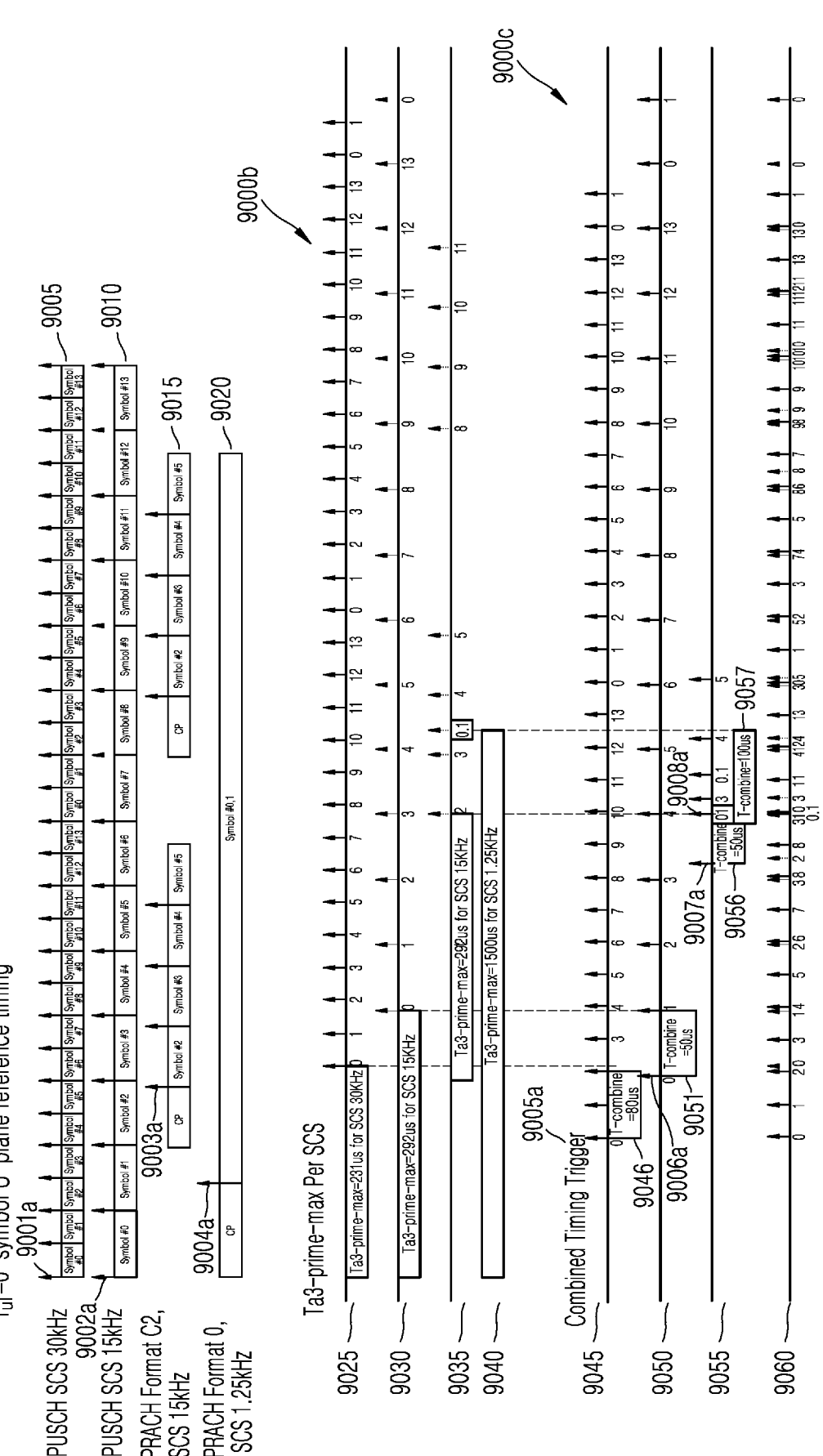
FIG. 9C is a view illustrating an example of combining multiple SCSs according to an embodiment.

FIG. 9C is a view illustrating an example of combining multiple SCSs according to an embodiment.

FIG. 9C may be a method performed in a middle node that can be used by utilizing the methods of FIGS. 9A and 9B. The method of FIG. 9C may represent a method performed in the middle node in FIGS. 1A to 9B.

FIG. 9C is a view illustrating how the middle node determines combining timing for multiple SCSs when one eAxC ID includes multiple SCSs and processes them separately.

Referring to 9000a in FIG. 9C, an uplink message that the middle node receives from a southbound node may include PUSCH 9005 with an SCS of 30 kHz, PUSCH 9010 with an SCS of 15 KHz, PRACH format C2 9015 with an SCS of 15 kHz, and PRACH format 0 9020 with an SCS of 1.25 kHz. In this case, multiple SCSs may be included in an identical eAxC ID. PUSCH 9005 with the SCS of 30 kHz may have U-plane reference timings 9001*a*, 9001*b*, . . . according to a size of the SCS when Tul=0, PUSCH 9010 with the SCS of 15 kHz may have U-plane reference timings 9002*a*, 9002*b*, . . . according to a size of the SCS when Tul=0, PRACH format C2 9015 with an SCS of 15 kHz may have U-plane reference timings 9003*a*, 9003*b*, . . . including CP according to a size of the SCS, and PRACH format 0 9020 with the SCS of 1.25 kHz may have U-plane reference timing 9004*a* according to a size of the SCS. Symbol duration between each U-plane reference timing may be used as a timing value for receiving uplink data. According to an embodiment, U-plane reference timing may use fixed symbol timing for a message scheduled by section type 1, and may use floating symbol timing for a message scheduled by a section type 3 C-plane.

Before receiving an uplink message, the middle node may receive information indicating that one eAxC ID includes multiple SCSs, and timing values (i.e., Ta3'-max and Ta3-prime-max) for transmitting data from a middle node according to an SCS used to an O-DU, from a controller or O-DU.

Referring to 9000*b* in FIG. 9C, it can be seen that Ta3'-max according to the SCS received by the middle node is applied to each message. Ta3'-max 9025 of 231 μs (microseconds) may be applied to PUSCH 9005 with the SCS of 30 kHz, Ta3'-max 9030 and 9035 of 292 us may be applied to PUSCH 9010 and PRACH format C2 9015 with the SCS of 15 kHz, and Ta3'-max 9040 of 1500 μs may be applied to PRACH format 0 9020 with the SCS of 1.25 kHz. Each Ta3'-max may be displayed at 9000*b* by applying U-plain reference timing in a time domain.

Referring to 9000*c* in FIG. 9C, it can be seen that a method of determining timing at which the middle node most efficiently starts combining by considering a time required for combining according to the SCS. Ta3'-max 9025 of 231 μs is applied to PUSCH 9005 with the SCS of 30 kHz, but 80 μs is applied to T-combine 9046, which is a maximum time required for combining 30 kHz of the middle node, and timing 9005*a* at which combining for the PUSCH 9005 with the SCS of 30 kHz needs to start may be determined. Ta3'-max 9030 and 9035 of 292 μs is applied to PUSCH 9010 and PRACH format C2 9015 with the SCS of 15 kHz, but 50 μs is applied to T-combine 9051 and 9056, which is a maximum time required for combining 15 kHz of the middle node, and timings 9006*a* and 9007*a* at which combining for PUSCH 9010 and PRACH format C2 9015 with the SCS of 15 kHz needs to start may be determined. Ta3'-max 9040 of 1500 μs is applied to PRACH format 0 9020 with the SCS of 1.25 kHz, but 100 μs is applied to T-combine 9057, which is a maximum time required for combining 1.25 kHz of the middle node, and timing 9008*a* at which PRACH format 0 9020 with the SCS of 1.25 kHz may be determined. Finally, timing at which combination needs to start determined for each message is arranged according to time, and the middle node may call message groups stored in the middle node according to the timing, combine them, and transmit them to an upper level. The timing at which combination needs to start determined for each message may be expressed as T-waiting.

The middle node may receive information indicating that one eAxC ID includes multiple SCSs from the controller. In these cases, when one eAxC ID includes multiple SCSs, the middle node may perform a call by combining other data fields in addition to the eAxC ID to accurately call data to be combined. For example, when there are multiple SCSs in one eAxC ID and a message to be combined is PRACH of Section type 3, they can be distinguished by filterindex (non-zero) and cplength (=0). In addition, when the message is NB-IoT of Section type 3, it can be distinguished by filterindex. In addition, when the message is mixed numerology of Section type 3, it can be distinguished by referring to a sectionID.

In FIGS. 9A to 9C, a SCS used in an O-RAN network, symbol duration according to the SCS, a main communication function, and a channel used may be determined as shown in Table 2 below.

TABLE 2

| SCS (sub-carrier spacing) | Symbol Duration Without CP | Air Technology | Channel |
|---|---|---|---|
| 1.25 KHz | 800 μs | LTE, 5G NR, NB-IoT | PRACH |
| 3.75 KHz | 266.6 μs | NB-IoT | NPUSCH, NPRACH |
| 7.5 KHz | 133.3 μs | LTE, 5G NR | PRACH |
| 15 KHz | 66.6 μs | LTE, 5G NR | PuxCH, NPUSCH |
| 30 KHz | 33.3 μs | 5G NR | PuxCH, SRS |
| 60 KHz | 16.65 μs | 5G NR | PuxCH, SRS |
| 120 KHz | 8.325 μs | 5G NR | PuxCH, SRS |
| 240 KHz | 4.16 μs | 5G NR | PuxCH, SRS |
| 480 kHz | 2.08 μs | 5G NR | PuxCH, SRS |
| 960 KHz | 1.04 μs | 5G NR | PuxCH, SRS |

Checking the table above, it can be seen that the SCS is divided into 10 and that symbol duration decreases as the SCS increases. 1.25 KHz and 3.75 kHz are mainly used in section type 3 signals. However, settings of the SCS are not limited to the table above and may be set differently depending on settings of a user, vendor, standard, etc.

Figure 10:
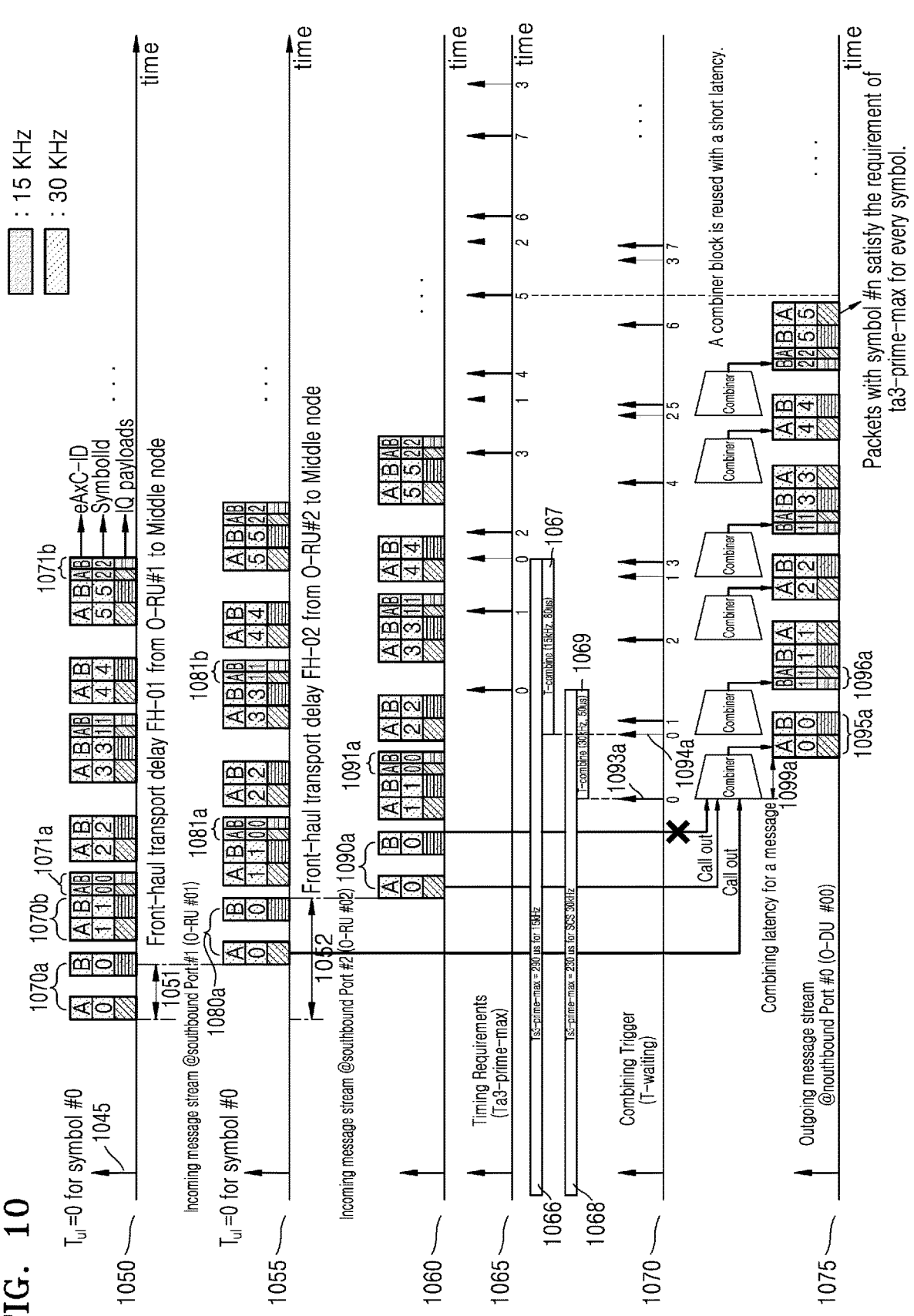
FIG. 10 is a view illustrating a method for a middle node combining messages when one eAxC includes multiple SCSs, according to an embodiment.

FIG. 10 is a view illustrating a method for a middle node combining messages when one eAxC includes multiple SCSs, according to an embodiment.

The middle node in FIG. 10 is the same as the middle node (FHM or cascade O-RU) described in FIGS. 1A to 9C and may be configured to perform the same or similar operations.

Referring to FIG. 10, when Tul=0 for symbol #0 in a time domain, multiple O-RUs may transmit data to the middle node according to timing indicated at 1050 according to symbol timing 1045. The data transmitted by the plurality of O-RUs may include 1070*a*, 1070*b*, . . . , 1070*f* with an SCS of 30 KHz and 1071*a*, 1071*b*, and 1071*c* with an SCS of 15 KHz.

When a first O-RU from among the plurality of O-RUs transmits data to the middle node, a first delay 1051 due to wired communication may occur. 1055 is a diagram showing timing at which uplink data transmitted from the first O-RU is received by the middle node. The data transmitted from the first O-RU is received by the middle node in the same order as it was sent.

When a second O-RU from among the plurality of O-RUs transmits data to the middle node, a second delay 1052 due to wired communication may occur. 1060 is a diagram showing timing at which uplink data transmitted from the second O-RU is received by the middle node. The data transmitted from the second O-RU is received by the middle node in the same order as it was sent.

The middle node may receive timing values (i.e., Ta3'-max and Ta3-prime-max) at which data needs to be transmitted from the middle node according to an SCS received from a controller or an O-DU to the O-DU before receiving uplink data. The received Ta3'-max is determined to be 290 μs for 15 kHz and 230 μs for 30 KHz. At 1065, the middle node may determine timing by specifying a Ta3'-max value received for each SCS from the symbol timing 1045.

At 1070, by applying a maximum time (T-combine) required for a corresponding middle node to combine data according to an SCS at timing 1065 determined by specifying the Ta3'-max value, the middle node may determine timing (T-waiting) at which the corresponding data need to be combined. For example, in a case of 1080*a* and 1090*a*, which are the first received data from among SCS 30 KHz data, the middle node needs to start combining as early as a maximum time (i.e., 50 μs) required to combine SCS 30 kHz at a time Ta3'-max (i.e., 230 μs) away from the symbol timing 1045, and thus, T-waiting determined at this time may be determined by first timing 1093*a*. Likewise, in a case of 1081*a* and 1091*a*, which are the first received data from among SCS 15 kHz data, the middle node needs to start combining as early as a maximum time (i.e., 80 μs) required to combine SCS 15 KHz at a time Ta3'-max (i.e., 290 μs) away from the symbol timing 1045, and thus, T-waiting determined at this time may be determined by second timing 1094*a*. For subsequent data, T-waiting may be determined based on received timing, Ta3'-max, and T-combine in the same way.

Based on the timing determined at 1070, the middle node may call data received and stored from multiple O-RUs in a storage through a processor at corresponding timing to a combiner 1099*a*. In data received from the first O-RU, 15 kHz data is also stored at corresponding timing, but it is not called because there is no timing for 15 kHz in the timing determined at 1070. In this case, the stored 1080*a* and 1081*a* have the same eAxC ID and the same symbol ID, so when a processor calls them to a combiner, they need to be called separately. This is a problem in this case because existing combiners perform combining on a message or eAxC ID basis. That is, because messages with different SCSs cannot be distinguished using only the eAxC ID, an additional method of distinguishing a corresponding message group is needed. At this time, when there are multiple SCSs with an identical eAxC ID and a message to be combined is PRACH of Section type 3, it can be distinguished by filterindex (non-zero) and cplength (=0). In addition, when the message is NB-IOT of Section type 3, it can be distinguished by filterindex. In addition, when the message is mixed numerology of Section type 3, it can be distinguished by referring to sectionID.

1075 may indicate the type of data ultimately output from the middle node. Data are called and combined according to the timing determined at 1070, and the combiner may discharge combined data after a delay 1099 for combining. In conclusion, the middle node may perform combining at T-waiting timing determined based on Ta3'-max and T-combine, based on an eAxC ID and symbol ID for data received at separate timings from the plurality of O-RUs. In addition, the middle node may distinguish and perform combining even if multiple SCSs are included in one eAxC ID.

However, at this time, all output data need to be output from the middle node within Ta3'-max set for each symbol.

FIG. 11 is a view illustrating a configuration of a middle node according to an embodiment.

The middle node in FIG. 11 is the same as the middle node (FHM, cascade FHM, or cascade O-RU) described in FIGS. 1A to 10 and may be configured to perform the same or similar operations.

According to an embodiment, a middle node 1100 may include the middle node (FHM or Cascade O-RU) described in FIGS. 1 to 10. In the middle node, functions may be included in one device, or each function may be divided into each device.

The middle node 1100 according to an embodiment may include a controller (or processor) 1110 that controls operations of the middle node, a transceiver (or transmitter/receiver) 1120 including a transmitter and a receiver, and a memory 1130. However, the disclosure is not limited to the above example, and the middle node 1100 may include more or fewer components than those shown in FIG. 11.

According to an embodiment, the transceiver 1120 may transmit and receive signals to and from other network nodes (e.g., southbound node, northbound node, O-DU, O-RU, controller, or other middle nodes). Signals transmitted and received from the middle node may include C-plane, U-plane, S-plane and M-plane signals, uplink data, and downlink data. In addition, the transceiver 1120 may receive a signal through a path such as a fiber and transmit it to the processor 1110, and transmit a signal determined and output from the processor 1210 through the channel.

According to an embodiment, the processor 1110 may control a middle node device to perform the operation of any one of the embodiments of FIGS. 1 to 10. The processor 1110, memory 1130, and transceiver 1220 do not necessarily have to be implemented as separate modules, and may be implemented as one component in the form of a single chip. The processor 1110, memory 1130, and transceiver 1220 may be electrically connected to each other. In addition, the processor 1110 may be an application processor (AP), a communication processor (CP), a circuit, an application-specific circuit, or at least one processor. The processor 1110 of the middle node 1100 may include a combiner, a copier, a pager, a trigger generator, and a parser to perform operations. Each function may be included in a separate device or may be included together in the processor 1110. The processor may be controlled to perform operations of a combiner, copier, pager, trigger generator, and parser.

According to an embodiment, the memory 1130 may store data such as basic programs, applications, and setting information for the operation of the middle node. In addition, the memory 1130 may store uplink and downlink data received by the middle node. In particular, the memory 1130 may provide stored data according to a call from the processor 1110. The memory 1130 may be composed of a storage medium such as ROM, RAM, hard disk, CD-ROM, and DVD, or a combination of storage media. The memory 1130 may include at least one buffer for temporarily storing uplink data or downlink data. In addition, there may be a plurality of memories 1130. In addition, the processor 1110 may perform the embodiments described above based on a program for performing the embodiments described above stored in the memory 1130.

FIG. 12 is a view illustrating a configuration of an O-DU according to an embodiment.

The O-DU in FIG. 12 is the same as the O-DUs described in FIGS. 1A to 10 and may be configured to perform the same or similar operations.

According to an embodiment, in an O-DU 1200, functions may be included in one device, or each function may be divided into each device.

The O-DU 1200 according to an embodiment may include a controller (or processor) 1210 that controls operations of the O-DU, a transceiver (or transmitter/receiver) 1220 including a transmitter and a receiver, and a memory 1230.

However, the disclosure is not limited to the above example, and the O-DU 1200 may include more or fewer components than those shown in FIG. 12.

According to an embodiment, the transceiver 1220 may transmit and receive signals to and from other network nodes (e.g., southbound node, northbound node, O-RU, controller, middle node, or upper network entity). Signals transmitted and received from the middle node may include C-plane, U-plane, S-plane and M-plane signals, uplink data, and downlink data. In addition, the transceiver 1220 may receive a signal through a wireless path or a wired path such as a fiber and transmit it to the processor 1210, and transmit a signal determined and output from the processor 1210 through the channel.

According to an embodiment, the processor 1210 may control an O-DU device to perform the operation of any one of the embodiments of FIGS. 1 to 11. The processor 1210, memory 1230, and transceiver 1220 do not necessarily have to be implemented as separate modules, and may be implemented as one component in the form of a single chip. The processor 1210, memory 1230, and transceiver 1220 may be electrically connected to each other. In addition, the processor 1210 may be an AP, a CP, a circuit, an application-specific circuit, or at least one processor.

According to an embodiment, the memory 1230 may store data such as basic programs, applications, and setting information for the operation of the O-DU 1200. In addition, the memory 1130 may store uplink and downlink data received by the O-DU. In particular, the memory 1230 may provide stored data according to a request from the processor 1210. The memory 1230 may be composed of a storage medium such as ROM, RAM, hard disk, CD-ROM, and DVD, or a combination of storage media. In addition, there may be a plurality of memories 1230. In addition, the processor 1210 may perform the embodiments described above based on a program for performing the embodiments described above stored in the memory 1230.

FIG. 13 is a view illustrating a configuration of a controller according to an embodiment.

The controller in FIG. 12 is the same as the controllers or O-DUs described in FIGS. 1A to 12 and may be configured to perform the same or similar operations.

According to an embodiment, in a controller 1300, functions may be included in one device, or each function may be divided into each device.

The controller 1300 according to an embodiment may include a controller (or processor) 1310 that controls operations of the controller, a transceiver (or transmitter/receiver) 1320 including a transmitter and a receiver, and a memory 1330. However, the disclosure is not limited to the above example, and the controller 1300 may include more or fewer components than those shown in FIG. 13.

According to an embodiment, the transceiver 1320 may transmit and receive signals to and from other network nodes (e.g., southbound node, northbound node, O-RU, O-DU, middle node, or upper network entity). Signals transmitted and received from the controller may include C-plane, U-plane, S-plane and M-plane signals, uplink data, and downlink data. In addition, the transceiver 1320 may receive a signal through a wireless path or a wired path such as a fiber and transmit it to the processor 1310, and transmit a signal determined and output from the processor 1310 through the channel.

According to an embodiment, the processor 1310 may control the controller to perform the operation of any one of the embodiments of FIGS. 1 to 12. The processor 1310, memory 1330, and transceiver 1320 do not necessarily have to be implemented as separate modules, and may be implemented as one component in the form of a single chip. The processor 1310, memory 1330, and transceiver 1320 may be electrically connected to each other. In addition, the processor 1310 may be an AP, a CP, a circuit, an application-specific circuit, or at least one processor.

According to an embodiment, the memory 1330 may store data such as basic programs, applications, and setting information for the operation of the controller 1300. In addition, the memory 1130 may store uplink and downlink data received by the controller. In particular, the memory 1330 may provide stored data according to a request from the processor 1310. The memory 1330 may be composed of a storage medium such as ROM, RAM, hard disk, CD-ROM, and DVD, or a combination of storage media. In addition, there may be a plurality of memories 1330. In addition, the processor 1310 may perform the embodiments described above based on a program for performing the embodiments described above stored in the memory 1330.

Various operations of the methods described above may be performed by any suitable device capable of performing corresponding functions. The device includes, but is not limited to, various hardware and/or software components and/or modules such as an ASIC or a processor. In general, when there are operations corresponding to the drawings, these operations may have a corresponding counterpart and functional components having the same number as the number of the counterpart.

The various illustrative logic blocks, modules, and circuits described in connection with the disclosure may be implemented or performed by a general-purpose processor designed to perform the functions disclosed herein, a digital signal processor (DSP), ASIC, FPGA or other programmable logic device (PLD), a discrete gate or transistor logic device, discrete hardware components, or any combination thereof. The general-purpose processor may be a microprocessor, but may alternatively be any commercially available processor, controller, microcontroller, or state machine. The processor may also be implemented in a combination of computing devices, for example, a combination of the DSP and the microprocessor, a plurality of microprocessors, one or more microprocessors in connection with a DSP core, or any other configuration.

In addition, the term "determining" encompasses a wide variety of actions. For example, the term "determining" may include computing, processing, deriving, examining, looking up (e.g., looking up in a table, database, or other data structure), identifying, and the like. The term "determining" may also include receiving (e.g., receiving information), accessing (accessing data in a memory), and the like. The term "determining" may also include resolving, selecting, choosing, establishing, and the like.

Numerous modifications and adaptations will be readily apparent to one of ordinary skill in the art without departing from the spirit and scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the spirit and scope of the following claims.

What is claimed is:

1. A method performed by a middle node in a communication system, the method comprising:

receiving, from a controller, a request message for capability information;

transmitting capability information of the middle node in response to the request message, wherein the capability information indicates whether the middle node supports processing uplink data containing multiple subcarrier spacings (SCSs) within a single extended Antenna-carrier ID (eAxC ID); and receiving, from the controller, timing information based on the capability information of the middle node, wherein the timing information is configured for the multiple SCSs within the single eAxC ID for processing the uplink data.

2. The method of claim 1, wherein the capability information of the middle node further comprises:

information indicating a maximum time required when the middle node performs uplink data combining.

3. The method of claim 1, wherein the timing information configured for to the multiple SCSs comprises:

information indicating latest timing at which the middle node transmits combined uplink data to a first communication node.

4. The method of claim 1, further comprising:

receiving, from the controller, information indicating that one eAxC ID includes multiple SCS in uplink data to be received by the middle node.

5. The method of claim 1, wherein the middle node is a fronthaul multiplexer (FHM) or a cascade radio unit (RU).

6. A middle node in a communication system, the middle node comprising:

a transceiver;

a memory; and at least one processor electrically connected to the transceiver and the memory, wherein the at least one processor is configured to:

receive, from a controller, a request message for capability information;

transmit capability information of the middle node in response to the request message, wherein the capability information indicates whether the middle node supports processing uplink data containing multiple subcarrier spacings (SCSs) within a single extended Antenna-carrier ID (eAxC ID); and receive, from the controller, timing information based on the capability information of the middle node, wherein the timing information is configured for the multiple SCSs within the single eAxC ID for processing the uplink data.

7. The method of claim 6, wherein the capability information of the middle node further comprises:

information indicating a maximum time required when the middle node performs uplink data combining.

8. The method of claim 6, wherein the timing information configured for to the multiple SCSs comprises:

information indicating latest timing at which the middle node transmits combined uplink data to a first communication node.

9. The method of claim 6, wherein the at least one processor is further configured to:

receive, from the controller, information indicating that one eAxC ID includes multiple SCS in uplink data to be received by the middle node.

10. The method of claim 6, wherein the middle node is a fronthaul multiplexer (FHM) or a cascade radio unit (RU).

* * * * *